(12) United States Patent
Borne-Pons et al.

(10) Patent No.: US 11,196,570 B2
(45) Date of Patent: Dec. 7, 2021

(54) CRYPTOLOGIC BLOCKCHAIN INTEROPERABILITY MEMBERSHIP SYSTEM

(71) Applicant: Accenture Global Solutions Limited, Dublin (IE)

(72) Inventors: Hugo Borne-Pons, Antibes (FR); Abdoulaye Faye, Antibes (FR)

(73) Assignee: Accenture Global Solutions Limited, Dublin (IE)

( * ) Notice: Subject to any disclaimer, the term of this patent is extended or adjusted under 35 U.S.C. 154(b) by 243 days.

(21) Appl. No.: 16/595,358

(22) Filed: Oct. 7, 2019

(65) Prior Publication Data

US 2021/0105144 A1  Apr. 8, 2021

(51) Int. Cl.
*H04L 9/32* (2006.01)
*H04L 9/30* (2006.01)

(52) U.S. Cl.
CPC .............. *H04L 9/3255* (2013.01); *H04L 9/30* (2013.01); *H04L 2209/38* (2013.01)

(58) Field of Classification Search
CPC ..... H04L 9/3255; H04L 9/30; H04L 2209/38; H04L 9/3263; H04L 2209/56; H04L 9/3239
See application file for complete search history.

(56) References Cited

U.S. PATENT DOCUMENTS

| 10,250,394 | B1 | 4/2019 | Borne-Pons et al. |
| 10,250,395 | B1 | 4/2019 | Borne-Pons et al. |
| 10,746,885 | B2 | 8/2020 | Furumiya |
| 10,826,683 | B2 | 11/2020 | Mazzrella |
| 2016/0260169 | A1 | 9/2016 | Arnold et al. |
| 2017/0155515 | A1 | 6/2017 | Androulaki et al. |
| 2017/0243193 | A1 | 8/2017 | Manian et al. |
| 2017/0250972 | A1* | 8/2017 | Ronda ....................... H04L 9/08 |
| 2017/0300978 | A1 | 10/2017 | Narasimhan et al. |
| 2017/0372300 | A1 | 12/2017 | Dunlevy et al. |
| 2018/0019879 | A1 | 1/2018 | Kravitz et al. |
| 2018/0088928 | A1 | 3/2018 | Smith et al. |
| 2018/0097635 | A1 | 4/2018 | Moses |

(Continued)

OTHER PUBLICATIONS

European Brief Communication issued to Application No. 18150503. 3, dated Apr. 26, 2021, 18 pages.

(Continued)

*Primary Examiner* — Darren B Schwartz
(74) *Attorney, Agent, or Firm* — Crowell & Moring LLP

(57) ABSTRACT

Systems and methods for membership-based cryptologic blockchain interoperability are provided. A receiver distributed ledger technology (DLT) network may include a data receiver node and a receiver validator node. The receiver validator node may receive a certification of token data stored on a furnisher blockchain. The certification may be signed by a plurality of furnisher validator nodes of a furnisher DLT network. To validate the certification, the receiver validator may obtain a furnisher credentials stored on a membership blockchain. The receiver validator node may perform the validation based on the furnisher credentials. The receiver validator node may digitally sign a validation of the certification. The receiver node of the receiver DLT network may commit the token data to a receiver blockchain in response to validation of the certification.

23 Claims, 16 Drawing Sheets

(56) References Cited

U.S. PATENT DOCUMENTS

| | | | |
|---|---|---|---|
| 2018/0165476 A1 | 6/2018 | Carey et al. | |
| 2018/0204213 A1 | 7/2018 | Zappier | |
| 2018/0264347 A1 | 9/2018 | Tran et al. | |
| 2018/0285996 A1 | 10/2018 | Ma | |
| 2018/0322491 A1* | 11/2018 | Madisetti | G06Q 20/389 |
| 2018/0365691 A1 | 12/2018 | Sanders et al. | |
| 2019/0043043 A1* | 2/2019 | Saraniecki | G06Q 20/382 |
| 2019/0044714 A1* | 2/2019 | Parker | G06F 16/1805 |
| 2019/0172026 A1* | 6/2019 | Vessenes | H04L 9/3247 |
| 2019/0278944 A1* | 9/2019 | Cheng | H04L 9/0637 |
| 2019/0303587 A1* | 10/2019 | Hamel | H04L 9/30 |
| 2020/0005290 A1* | 1/2020 | Madisetti | G06Q 20/02 |
| 2020/0050690 A1* | 2/2020 | Gaur | H04L 9/3239 |
| 2020/0052879 A1* | 2/2020 | Gaur | H04L 63/123 |
| 2020/0084046 A1* | 3/2020 | Bessonov | H04L 9/3239 |
| 2020/0084051 A1 | 3/2020 | Bessonov et al. | |
| 2020/0153606 A1* | 5/2020 | Li | H04L 9/30 |
| 2021/0006410 A1* | 1/2021 | Uhr | G06Q 20/108 |

OTHER PUBLICATIONS

Bellamy III, Woodrow: "IOT, Blockchain Proposed to Improve Aircraft Maintenance Process—Aviation Today," http://www.aviationtoday.com/2017/01/13/iot-blockchain-proposed-to-improve-aircraft-maintenance-process/.

Yuan, Yong et al., "Towards blockchain-based intelligent transportation systems," 2016 IEEE 19th International Conference on Intelligent Transportation Systems (ITSC), IEEE, Nov. 1, 2016, pp. 2663-2668.

Extended European Search Report in Europe Application No. 20194668.8, dated Feb. 19, 2021, 12 pages.

Luo et al., "A Multiple Blockchains Architecture on Inter-Blockchain Communication", 2018 IEEE International Conference on Software Quality, Reliability and Security Companion (QRS-C), IEEE, Jun. 20, 2018, pp. 139-145, XP033383707, DOI: 10.1109/QRS-C.2018.00037, retrieved on Aug. 9, 2018, 7 pages.

Matsumoto et al., "IKP: Turning a PKI Around with Blockchains", IACR, International Association for Cryptologic Research, vol. 20161027:211034, Oct. 26, 2016, pp. 1-33, XP061021999, retrieved on Oct. 26, 2016, 33 pages.

Bitfury Group, White Paper: "Digital Assets on Public Blockchains", Mar. 15, 2016, XP055384342, Retrieved from the Internet at URL: <http://bitfury-com/content/5-white-papers-research/bitfury-digital_assets_on_public_blockchains-1.pdf>, retrieved on Jun. 22, 2017, 37 pages.

Kashish, "Implementing PBFT in Blockchain", Aug. 4, 2019, XP055772504, Retrieved from the Internet at URL: <https://medium.com/coinmonks/implementing-pbft-in-blockchain-12368c6c9548>, retrieved on Feb. 4, 2021, 26 pages.

"Interledger Architecture," Interledger, Retrieved from Internet on Aug. 27, 2018, pp. 1-8, published online by Interledger Team, URL: https://interledger.org/rfcs/0001-interledger-architecture/.

Jae Kwon et al., "A Network of Distributed Ledgers," Cosmos, dated Jul. 6, 2018, pp. 1-41, published online by Cosmos Network at URL https://cosmos.network/docs/resources/whitepaper.html#appendix.

Dr. Gavin Wood, "Polkadot: Vision for a Heterogeneous Multi-Chain Framework," dated Dec. 8, 2016, pp. 1-21, Draft 1, published online by PolkaDot Network at URL https://polkadot.network/PolkaDotPaper.pdf.

Mirko Boehm, "The Emerging Blockchain Innovation Landscape," dated Oct. 22, 2018, pp. 1-26, published by Open Invention Network, Durham, NC.

Jon Wright et al., "Blockchain Innovation," dated Oct. 19, 2018, pp. 1-4, published by Sterne Kessler, Washington, D.C.

Koen Lievens, "Examining Blockchain Inventions," dated Oct. 22, 2018, pp. 1-7, published by the European Patent Office, Munich, Germany.

Richard Bennett, "Scoping Roundtable for Blockchain," dated Oct. 22, 2018, pp. 1-2, published by the European Patent Office, Munich, Germany.

Deutsche Bank, "Blockchain," dated Oct. 2018, pp. 1-12, published by Deutsche Bank AG, Frankfurt, Germany.

Marieke Flament et al., "Blockchain Technology and Fields of Application," pp. 1-41, published by Circle Internet Financial Limited.

Georg Weber, "Searching Blockchain Patents," European Patent Office, dated Dec. 4, 2018, pp. 1-7, published by the European Patent Office, Munich, Germany.

Yann Ménière, "The emerging blockchain patent landscape," European Patent Office, dated 4, 2018, pp. 1-10, published by the European Patent Office, Munich, Germany.

Koen Lievens, "Examining Blockchain Inventions Based on our established CII practice," European Patent Office, dated Dec. 4, 2018, pp. 1-18, published by the European Patent Office, Munich, Germany.

Wang Xinyi, "How does CNIPA deal with Blockchain," dated Dec. 2018, pp. 1-23, published by National Intellectual Property Administration, Hague, Netherlands.

Nobuyuki Taniguchi, "Evolution of Blockchain-related Patents in Japan," dated Dec. 4, 2018, pp. 1-15, published by Nakamura & Partners, Tokyo, Japan.

* cited by examiner

CRYPTOLOGIC BLOCKCHAIN INTEROPERABILITY MEMBERSHIP SYSTEM

TECHNICAL FIELD

This disclosure relates to distributed ledger technology and, in particular, to distributed ledger interoperability.

BACKGROUND

A distributed ledger may include a consensus of replicated and synchronized digital data across multiple nodes. Participants of a distributed ledger may apply an agreed upon protocol for, verifying, storing, maintaining, and modifying information stored in the distributed ledger. In many examples, a distributed ledger may be implemented by way of one or more blockchains implemented in a peer-to-peer network. The unique protocol, technologies, and other design considerations of a particular distributed ledger may inhibit cohesive sharing, synchronization, and/or transferring of information with other distributed ledgers.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
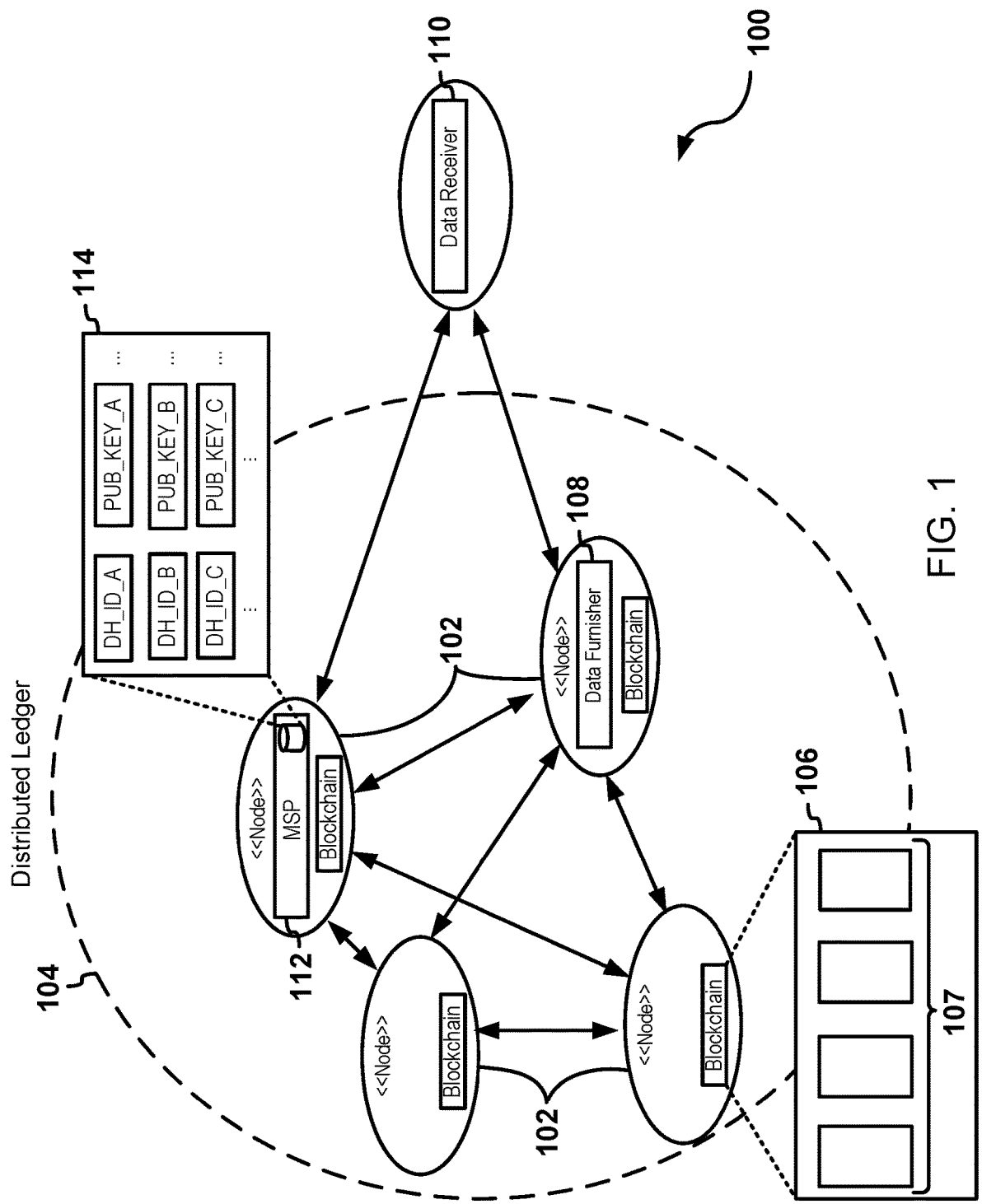
FIG. 1 illustrates a first example of an interoperable cryptologic blockchain system.

A distributed ledger technology (DLT) may apply an agreed upon protocol for interaction with a blockchain. The unique protocol, technologies, and other design considerations of a DLT may inhibit cohesive sharing, synchronization, and/or transferring of information between distributed ledgers, particularly when each distributed ledger implements a different underlying type of DLT. As more and more DLTs become ubiquitous among various organizations, participation in distributed ledger networks to provide data sharing, transferring, and synchronization between the distributed ledger networks may become cumbersome, inefficient, or otherwise undesirable.

Transfer information, or management rights of information, between distributed ledgers may involve coordination of interoperability operations (i.e. transferring, locking, committing, etc.) performed separately on the distrusted ledgers according to an interoperability protocol. In some examples, a smart contract may govern the interoperability protocol as further described in U.S. Pat. No. 10,250,394 entitled "CRYPTOLOGIC SELF-EXECUTING BLOCKCHAIN EXPORT COMMITMENT", which is hereby incorporated by reference in its entity. During interoperability (i.e. exporting or sharing data), a node of a distributed ledger may perform various operations that are dependent upon certifications stored on another distributed ledger. For example, before committing token data to a receiver blockchain, a node for the receiver blockchain may validate that the token data is locked on the furnisher blockchain. Technical challenges arise when sharing and validating the certifications between distributed ledgers and/or distributed ledger technologies. For example, each distributed ledger may be governed based on different rules, conventions, and design patterns that make cross communication between distribute ledgers cumbersome and inefficient. Moreover, malicious agents of a distributed ledger may pose a threat to the integrity of a distributed ledger, particularly from data sources external to a distributed ledger.

Accordingly, there is disclosed digital systems and methods for membership based cryptological blockchain interoperability. By way of an introductory example, a receiver DLT network may include a data receiver node and a receiver validator node. The receiver validator node may receive a certification of token data stored on a furnisher blockchain. The certification may be signed by multiple furnisher validator nodes of a furnisher DLT network. The receiver node of the receiver DLT network may commit the token data to a receiver blockchain in response to validation of the certification by multiple receiver validators of the receiver DLT network. In some examples, the validation may occur based on execution of verification logic stored on the receiver blockchain.

The receiver validator node may validate the certification. For example, the receiver validator may obtain furnisher credentials stored on a membership blockchain. The furnisher credentials may include public keys for furnisher validator nodes of the furnisher DLT network. The receiver validator node may determine the furnisher validator nodes signed the certification based on the public keys. The receiver validator node may digitally sign a validation of the certification. The receiver node may store the validation on the receiver blockchain to permit committal of the token data on the furnisher blockchain.

In another aspect of the system and method described herein, a furnisher DLT network may include a receiver node and a receiver validator node. The receiver validator node may receive a certification of token data stored on a receiver blockchain. The certification may be signed by multiple receiver validator nodes of a receiver DLT network. The furnisher node of the furnisher DLT network may lock the token data on a furnisher blockchain in response to validation of the certification by the furnisher validator nodes. In some examples, the receiver node of the receiver DLT network can also verify the certification before communicating the certification to the receiver validator.

The furnisher validator node may validate the certification based on a series of operations. For example, the furnisher validator may obtain receiver credentials stored on a membership blockchain. The receiver credentials may include public keys for multiple receiver validator nodes of the receiver DLT network. The furnisher validator node may determine each of the receiver validator nodes signed the certification based on the public keys of the receiver validator nodes. The furnisher validator node may digitally sign a validation of the certification. The furnisher validator may store the validation on the furnisher blockchain to permit the token data to be locked on the furnisher blockchain.

An example of a technical advancement achieved by the systems and methods described herein may be that DLT networks for respective distributed ledgers may mutually establish trust with a membership blockchain that stores identity and credential information. The membership blockchain may serve as a secure and auditable source of identity and credentialing for each DLT network engaged in interoperability. The membership blockchain may be replicated across multiple nodes of a membership DLT network to provide a membership distributed ledger. Interoperability validators (hereinafter validators) of a DLT network may validate certifications made by the other DLT networks based on registration transaction(s) stored in the membership distributed ledger. Registering validators with the membership DLT network may involve a quorum of validators of a DLT network specifying and digitally signing registry transaction(s), thus preventing malicious validators from registering membership.

Another technical advancement of the systems and methods described below may be that coupling of distributed ledger technologies is minimized while cohesion between distributed ledger technologies is maximized. For example, nodes of each of the DLT networks may validate information exchanged between the DLT networks without a gateway node between the DLT networks. Moreover, validators of a DLT network need not communicate directly with validator(s) of other DLT network to validate certifications. Consensus may be shared between DLT networks with a multi-signature message that can be validated based on the public keys and identities of nodes made available to the interoperable DLT networks via the membership blockchain. Information may be shared and/or exchanged between blockchains of the DLT networks even when the rules, protocols, and/or technology of the each of the DLT networks is different. Additional benefits, efficiencies, and improvements over existing market solutions are made evident in the systems and methods described herein.

FIG. 1 illustrates a first example of an interoperable cryptologic blockchain system 100. The system 100 may include one or more blockchain nodes 102 that participate in a DLT network 104. The blockchain nodes 102 may include full or partial nodes of the DLT network 104. For example, the blockchain node 102 may include a physical or virtual server. For example, the blockchain node 102 may store and/or interact with a complete or partial copy of a blockchain 106. For example, the blockchain node 102 may store a copy of the blockchain 106 (i.e. a local blockchain). The blockchain node 102 may communicate with other blockchain nodes based on a consensus protocol to validate and/or replicate information stored on the local blockchains of other blockchain nodes in the DLT network.

The DLT network 104 may include a combination of the blockchain nodes 102 that respectively communicate with a locally stored blockchain via a protocol for the distributed ledger. For example, the DLT network 104 may include a peer-to-peer network in which multiple blockchain nodes communicate to validate and/or replicate information stored on a blockchain. A node of the DLT network may execute the consensus protocol of the DLT to determine whether to update the blockchain 106 with new information (e.g. transactions) or modifications and removal of existing information. The consensus protocol may cause the node to communicate with other nodes of the DLT network to determine changes to the blockchain are permitted. The node(s) of the DLT network may append the information to the blockchain in response to consensus among the nodes of the DLT network reaching agreement. New and/or updates to information may be appended to the blockchain according to the DLT.

The blockchain 106 may include distributed ledger that is stored, organized, and/or implemented according a DLT. The blockchain 106 may include datablocks 107 that are linked according to a cryptography. The arrangement of data blocks and associations between information stored in the data blocks are established by a DLT. For example, the blockchain 106 may provide a growing, shared digital data flow, which serves as the source of truth between the blockchain nodes 102. Depending on the DLT, the datablocks 107 of the blockchain 106 may include a genesis datablock that is the initial datablock of the blockchain 106. Successive datablocks may be appended to the blockchain 106 over time. The blockchain 106 may provide a chronological ledger of information. One or more of the successive datablocks may include a hash of a previous datablock, a header of the previous datablock, and/or other portions of the previous datablock, depending in the DLT. Modifications to one or more datablocks in the blockchain 106 may cause inconsistencies in the hashed information stored in the successive datablocks. The inconsistencies may be detected and the blockchain nodes 102 of the DLT network 104 may prevent modification to previously appended or existing information in the blockchain 106. In some DLTs, modifications to the blockchain 106 may be prohibited unless a majority, or some other predefined number, of the blockchain nodes 102 consent to the modifications.

In some examples, the blockchain 106 may include token data. As described herein, token data may refer to asset data stored on a blockchain. Token data may have various types. For example, token data may include native assets, programmed assets and/or other objects types applicable in DLT. Native assets (such as, crypto-currency coins, hard tokens, native token, and/or other spendable assets) may be compliant with a particular distributed ledger.

Programmed assets may include code, scripts, smart contracts, or other non-spendable and/or non-native token data. Programmed assets may be replicated and their state can be kept consistent where the underlying logic (e.g., in the case of code or scripts) is independent resources or environment factors particularized to a specific DLT. For example, code written in a language native to a first DLT may be transferred to a second DLT with a second, different native language where the logical structure of the code may be translated to the second native language or emulated within the environment of the second DLT.

Additionally or alternatively, programmed assets may be transferable where a particular order of events does not affect the state of the programmed asset. DLTs may resolve disagreements in event sequences through consensus. However, consensus on one DLT may be independent of consensus on a second. Accordingly, different DLTs may not necessarily agree upon a common order for the same events because the DLTs may represent independent consensus regions. Therefore, for an order-dependent programmed asset, the state of the asset on a first DLT may not necessarily inform the proper state for the order-dependent programmed asset on another DLT. In some cases, a portion of an order-dependent programmed asset may be order independent.

At least one of the blockchain nodes 102 may include a data furnisher 108. The data furnisher 108 may furnish particular information stored in the blockchain 106 to one or more receivers external to the DLT network 104. In some examples, the data furnisher 108 may be authorized to access and/or manage particular information stored in the blockchain 106. Alternatively or in addition, the data furnisher 108 may provide a human or non-human entity with access to the DLT network 104. In some examples, the DLT network 104 may include one or more data furnisher 108.

The system may further include a data receiver 110. The data receiver 110 may include a non-node of the DLT network 104. Alternatively or in addition, the data receiver 110 may include a node of a separate DLT network (See FIG. 5 for an example). Unlike the data furnisher 108, the data receiver 110 may not have access to the blockchain 106 for the DLT network 104. The data receiver 110 may receive the token data stored in the blockchain 106 from one or more blockchain nodes 102, such as the data furnisher 108.

In many circumstances, it may be desirable to share and/or export token data stored in the blockchain 106 with external entities, such as the data receiver 110, without adding nodes to the DLT network 104. In the example illustrated in FIG. 1, sharing and/or exporting information to/with the data receiver 110 presents technical challenges, including, among other challenges described here, the ability for the data receiver 110 to verify that the token data is present on the blockchain 106 and/or the token data authorized for sharing/export, prevention double spend between the blockchain nodes 102 of the DLT network 104 and non-nodes, and ensuring synchronization of the token data between nodes of the DLT network 104 and non-nodes of the DLT network 104. Participants of the DLT network may provide a certification of the token data.

As described herein, a certification of the token data may include a confirmation between nodes of the DLT network 104 as to the state of the token data stored on the blockchain. The certification of the token data may include an event proof corresponding to the token data. Alternatively or in addition, the certification of the token data may include information that indicates one or more nodes agree that a particular event corresponding to the token data is valid and/or present on the blockchain. For example, the certification of the token data may include information that indicates one copy of the token data exists on the blockchain. Alternatively or in addition, the certification may include information that indicates the token data has not been transferred or exported to any other entity or blockchain. In examples where the token data is being exported, the certification of the token data may include information that indicates one or more nodes agree that the token data is locked on the blockchain. In some examples, the certification may include a digital signature of a set of information. Alternatively or in addition, the certification may digitally signed based on one or more public/private key pairs. Table 1 provides various examples of certifications of token data.

TABLE 1

| Certification of Token Data | |
| --- | --- |
| Storage Certification | A storage certification includes a certification that token data is (or is not) stored on a blockchain. |
| Lock Certification | A lock certification may include a certification that token data is (or is not) locked on a blockchain. Updates to locked token data may be refused, rejected, or otherwise not validated. |
| State Certification | A state certification may include a certification that token data is (or is not) associated with a state in a smart contract. |

A digital signature may include information that is encrypted by a source, such as the data furnisher 108. The information may include, for example, the token, a certification, an authorization to share or export the token data, and/or an identifier of the token data, and/or a transaction. The information may be encrypted based on a private key that is mathematically linked to a public key. The public key corresponding to the private key may unlock, decrypt, and/or verify the encrypted data. In an example, the digital signature may include a hash of data to be signed. The data furnisher 108 may obtain a private key and encrypt the hash of data based on the private key. The digital signature may include the encrypted hash and in some examples, information related to the encryption (such as the hashing algorithm). In general, to sign information refers to encrypting and/or encoding a piece of information based on a private key that can be decrypted and/or decoded based on the public key.

In some examples, the digital signature may be a multi-signature. A multi-signature may be a digital signature in which information is signed by multiple parities. For example, information, such as the token, an authorization to share or export the token data, and/or an identifier of the token data, and/or a transaction, may be encrypted based on the private key of multiple nodes of the DLT network 104.

A source is said to digitally sign information when one or more sources digitally sign the information based on corresponding public/private key pairs. For example, the blockchain node 102 may digitally sign a certification by encrypting the certification based on a public/private key pair. Alternatively or in addition, the certification may be included in a transaction for the blockchain 106, and the transaction may be digital signed. In some examples, the transaction may include a multi-signature transaction where multiple blockchain nodes sign the transaction and/or information included therein.

At least one of the blockchain nodes 102 may further include a membership service provider 112. The membership service provider 112 may provide access to the identities and cryptological information associated with the blockchain nodes 102 of the DLT network 104. Alternatively or in addition, the membership service provider 112 may provide the identities of nodes and non-nodes of the DLT network 104. For example, the membership service provider 112 may receive identification information and public key information provided by the data furnisher 108 and/or the data receiver 110.

The membership service provider 112 may include a membership service repository 114. The membership service repository 114 may include a database or memory that stores the identities and cryptological information associated with nodes and non-nodes of the DLT network 104. For example, the membership service repository 114 may include associations between the identities and the cryptological information. The identities may include IP addresses, MAC addresses, host names, user names, and/or any other information that identifies a node or non-node of the DLT network 104. The cryptological information may include any information that is used to ensure the authenticity of a digital signature. For example, the cryptological information may include a public key that corresponds to a private key that is applied to generate a digital signature.

In some examples, the data receiver 110 may communicate with the membership service provider 112 to receive the public key of the data furnisher 108 or multiple data furnishers. In some examples, the data receiver 110 may submit a message or query to the membership service provider 112. After receiving one or more public key, the data receiver 110 may verify the truth of token data shared by or exported from the DLT network 104. For example, the data receiver 110 may receive certification information from the data furnisher 108 (or some other node of the DLT network 104. The certification information may include a digital signature corresponding to the token data. The digital signature may include a certification that the data furnisher 108 has agreed to export and/or share the token data. The data receiver 110 may confirm that the data furnisher 108 signed the digital signature based on the public key of the data furnisher 108.

Figure 2:
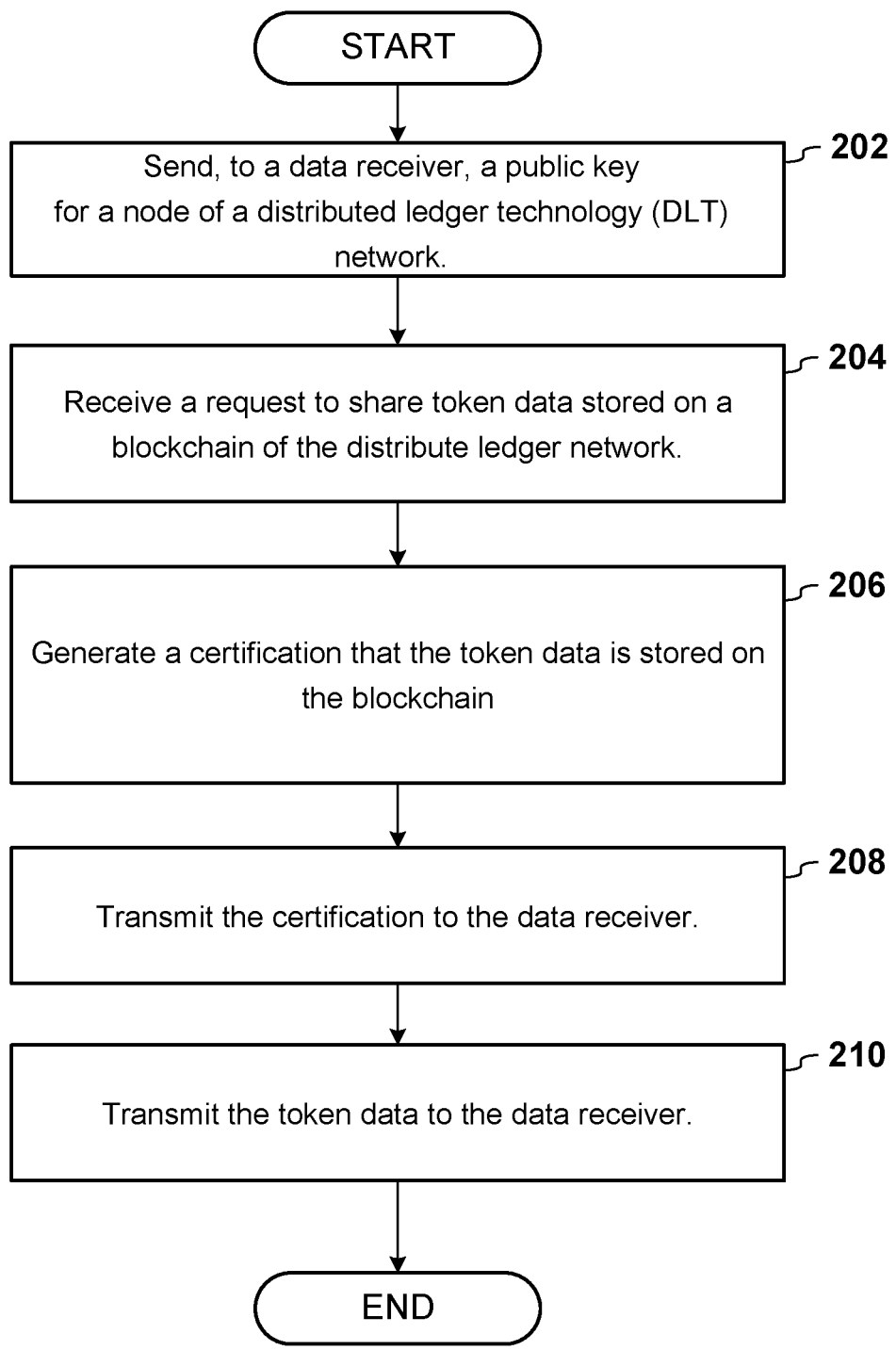
FIG. 2 illustrates a first example of a flow diagram for logic of an interoperable cryptologic blockchain system.

FIG. 2 illustrates a first example of a flow diagram for logic of the interoperable cryptologic blockchain system 100. The membership service provider 112 may send, to the data receiver 110, a public key for a node of the DLT network 104 (202). For example, the data receiver 110 may communicate a request to the membership service provider 112 for the public key of one or more data furnishers for token data stored in the blockchain 106. The query request may include an identifier of the one or more data furnishers. The membership service provider 112 may search the membership service repository 114 and select one or more public keys corresponding to the data furnishers. The membership service provider 112 may provide the public keys to the data receiver 110.

A blockchain node may receive, from the data receiver 110, a request to share token data stored in the blockchain 106 of the DLT network 104 (204). In some examples, the blockchain node may include the data furnisher 108. Alternatively or in addition, the blockchain node may include the membership service provider 112. For example, a blockchain node may include logic for the data furnisher 108 and logic for the membership service provider 112. In other examples, the data furnisher 108 may be physically or logically separated from the membership service provider 112.

The blockchain node may generate a certification of the token data (206). In examples where the token data is being exported, the certification may include a certification that the token data is locked on the blockchain. The certification may include a digital signature based on a participate private key and a public key. For example, the data furnisher 108 may sign the digital signature with the node private key. Alternatively or in addition, the certification may include multiple digital signatures and/or a multi-signature signed by multiple nodes of the DLT network 104. The blockchain node or node(s) may have previously shared a corresponding public key with the membership service provider 112 that can be used to validate the multi-signature.

In some examples, multiple blockchains may communicate with each other via a communications medium and/or the blockchain 106, to certify information to be shared and/or exported from the DLT network 104. In one example, each of the blockchain nodes 102 may identify the request from the data receiver 110 on a local blockchain in response to the local blockchain being synchronized according to a protocol of the DLT network 104. Alternatively or in addition, the data furnisher 108 may communicate with one or more additional nodes to obtain the digital signatures.

The blockchain node may transmit the certification to the data receiver 110 (208). For example, the data furnisher 108 may send the certification to the data receiver 110. The data receiver 110 may verify the certification based on the public key(s). For example, the data receiver 110 may determine that the digital signature was created by the data furnisher 108 based on the public key of the data furnisher 108 provided by the membership service provider 112. In some examples, the data receiver 110 may receive a multi-signature or multiple digital signatures that are respectively signed by multiple nodes. The data receiver 110 verify that each of the digital signatures were signed by a corresponding one of the multiple data furnishers. For example, each of the node(s) may separately communicate the digital signature to the data receiver 110. Alternatively or in addition, the data furnisher 108 of one node may communicate all of the digital signatures. Accordingly, the data receiver 110 may verify that the all data nodes and/or a sub-set of the nodes have certified the token data.

In some examples, the certification may include the token data. For example, the token data may be encrypted based on one or more private keys of nodes in the DLT network 104. Accordingly, when the certification is transmitted, the token data may also be transmitted. In other examples, the certification may include identifying information for the token data that may be subsequently used to access the token data.

The blockchain node may transmit the token data to the data receiver (210). For example, the blockchain node may transmit the token data to the data receiver in response to the data receive being authorized to access the token data. The certification may be determined based on one or more digital signatures of data furnishers that agree to share and/or export the data. For example, the data furnisher 108 may access the token data from the receiver blockchain. In some examples, the token data may be included in one or more datablocks on the blockchain. The data furnisher may communicate the token data and/or the datablock(s) to the data receiver.

In examples, where the token data is exported to the data receiver, the blockchain node may lock token data within DLT network 104. The data furnisher 108 may lock the token data by adding a data block to the blockchain in accordance with the DLT. The datablock may indicate that the token data is locked. The data furnisher 108, and/or other nodes of the DLT network 104, may restrict certain information from being appended to the blockchain in response to the token data being locked. Alternatively or in addition, the nodes of the DLT network 104 may invalidate additional datablocks comprising update information corresponding to the token data.

Figure 3:
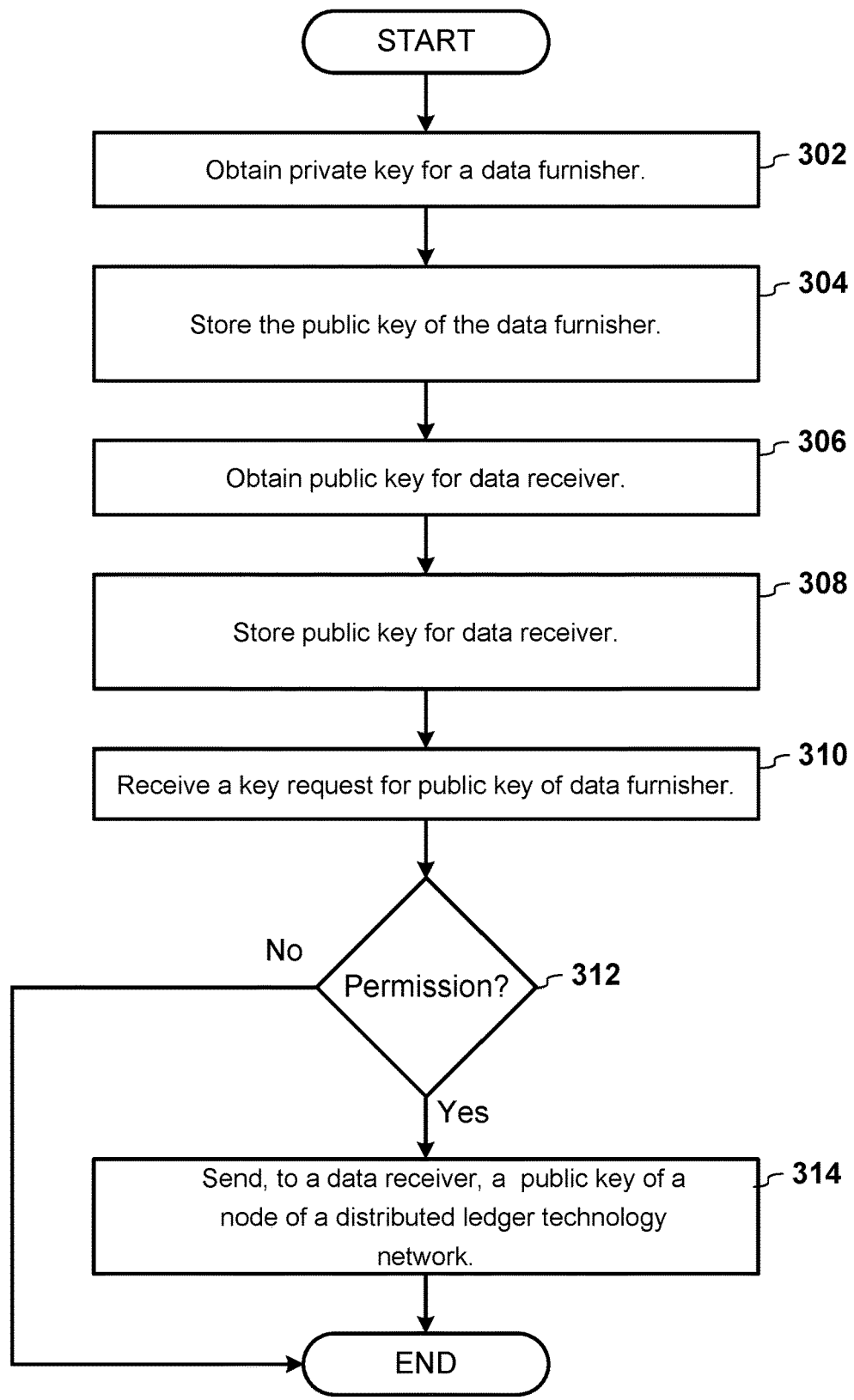
FIG. 3 illustrates a second example of a flow diagram for logic of an interoperable cryptologic blockchain system.

FIG. 3 illustrates a second example of a flow diagram for logic of the interoperable cryptologic blockchain system 100. The membership service provider 112 may obtain a private key for the data furnisher 108 (302). For example, the data furnisher 108 may generate a private key and public key pair. The data furnisher 108 may communicate the public key to the membership service provider 112.

The membership service provider 112 may store the public key (304). For example, the membership service provider 112 may store the public key in the membership service repository 114. In some examples, the membership service repository 114 may include the identifier of the data furnisher 108 that provided the public key. The identifier of the data furnisher 108 may be associated with the public key in the membership service repository 114.

The membership service provider 112 may obtain a public key for data receiver 110 (306). For example, the data receiver 110 may communicate the public key of the data receiver 110 to the membership service provider 112. Alternatively or in addition, the data receiver 110 may communicate an identifier of the data receiver 110 to the membership service provider 112.

The membership service provider 112 may store the public key of the data receiver 110 (308). For example, the membership service provider 112 may store the public key in the membership service repository 114. In some examples, the public key for the data receiver 110 may be associated with the identifier of the data receiver 110. The membership service provider 112 may provide the public key of the data receiver 110 based on identifying information corresponding to the data receiver 110.

The membership service provider 112 may receive a key request for a public key of a data furnisher (310). In some examples, the key request may include an identifier of the data receiver 110 and/or an identifier of a data holder. The membership service provider 112 may provide the public key of the data furnisher 108 and/or the data receiver 110 based on the key request.

The membership service provider 112 may determine whether the data receiver 110 is permitted to receive the public key of one or more data furnishers (312). For example, the membership service repository 114 may include a share permission that specifies a correspondence between one or more data furnishers and one or more data receivers. The share permission may have been previously communicated to the membership service provider 112. The share permission may include identifiers corresponding to the one or more data furnishers and/or one or more data receivers. The share permission may indicate, for example, that the public key of a data furnisher is or is not permitted to be shared with any data receiver and/or with specified data receivers.

In response to determination that the data receiver 110 is permitted to receive the public key of the data furnisher 108, the membership service provider 112 may send, to the data receiver 110, the public key for a node, such as the data furnisher 108, of the DLT network 104 (314).

Figure 4:
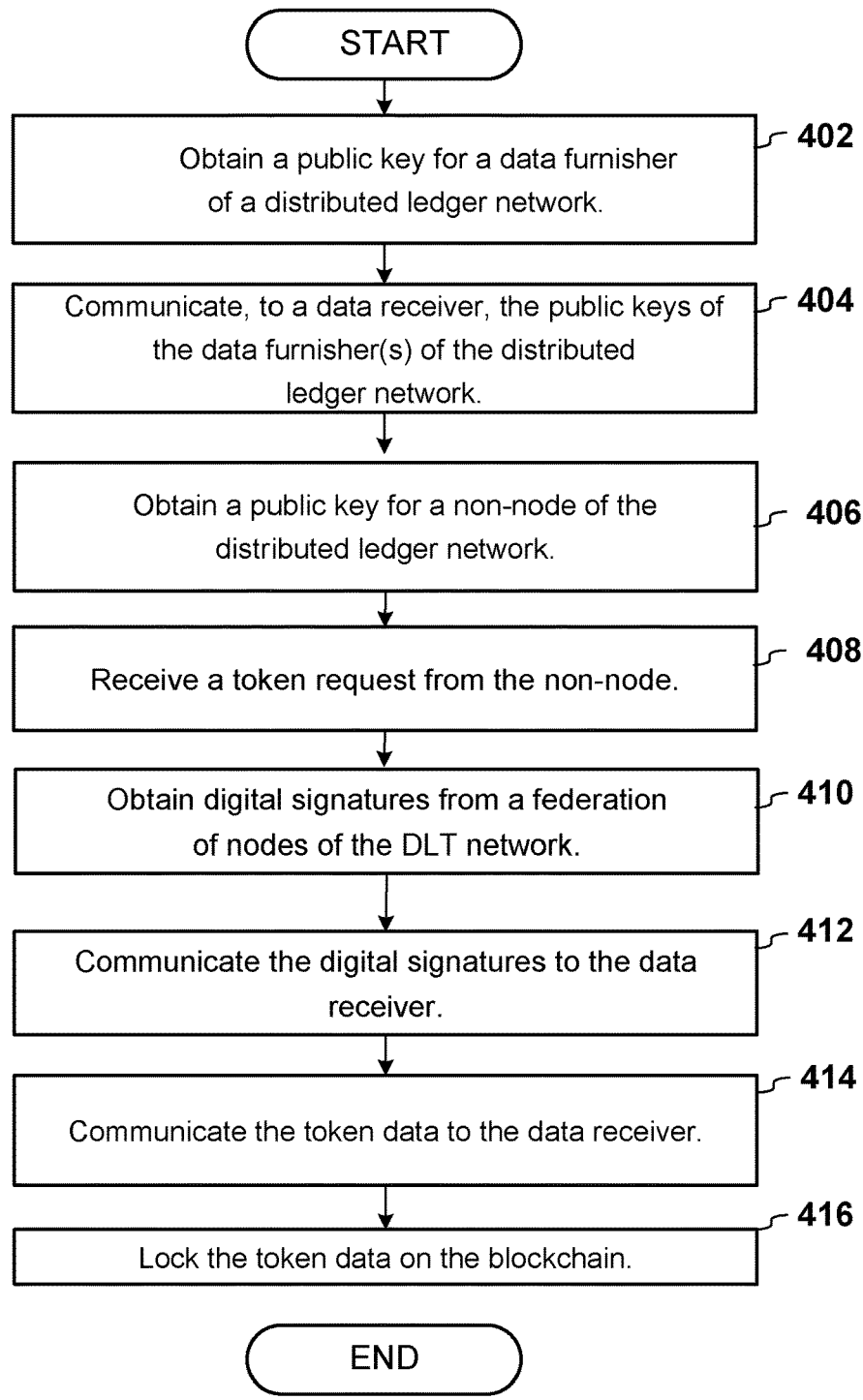
FIG. 4 illustrates a third example of a flow diagram for logic of an interoperable cryptologic blockchain system.

FIG. 4 illustrates a third example of a flow diagram for logic of the interoperable cryptologic blockchain system 100. The membership service provider 112 may obtain a public key for a data furnisher 108 of the DLT network 104 (402). For example, the data furnisher 108 may generate a private key and public key pair for a node. The data furnisher 108 may communicate the public key to the membership service provider 112. Alternatively or in addition, the membership service provider 112 may obtain the public key of multiple nodes within the DLT network 104. The membership service provider 112 may store the public key(s) of the node(s). For example, the membership service provider 112 may store the public key(s) in the membership service repository 114. In some examples, the membership service repository 114 may include the identifier of the nodes that provided the public keys. The identifier of the nodes may each be associated with a corresponding public key in the membership service repository 114.

The membership service provider 112 may communicate, to the data receiver 110, the public key(s) of the nodes of the DLT network 104 (404). For example, the data receiver 110 request the public keys of one or more data furnishers that are nodes of the DLT network 104. The query request may include the identifiers of the one or more data nodes. The membership service provider 112 may communicate the public key(s) of the data furnishers that correspond to the identifiers of the one or more data furnishers.

The membership service provider 112 may obtain a non-public key for a non-node of the DLT network 104 (406). For example, the non-node may include the data receiver 110. The data receiver 110 may communicate a public key to the membership service provider. The public key may correspond to a private key used to sign information.

The data furnisher 108 may receive a token data request from the non-node (408). The token data request may identify the token data to be exported from the DLT network 104. In some examples, the data furnisher, and/or other nodes of the DLT network 104, may prohibit additional information related to updates to the token data to be added to the block chain after the token data is locked.

The data furnisher 108 may obtain digital signatures from a federation of nodes of the DLT network 104 (410). The federation of nodes may include a subset of nodes of the DLT network 104. The federation of nodes may have previously agreed, with the data receiver, to share or export the token data. For example, the federal of nodes may each have authority to export or share the token data. The digital signatures may certify that the each node included in the federation of nodes confirm that the token data is stored and/or locked on the blockchain for the furnisher DLT network 104.

The data furnisher 108 may communicate the digital signatures to the data receiver (412). The digital signatures may include digital signatures of the token data or a proof of the token data's existence on the blockchain, such as an identifier of the token data. The digital signatures may be signed based on the private keys of the federation of nodes. The corresponding public keys of the federation of nodes may be stored in the membership service provider 112. The data receiver 110 may access the public keys from the membership service provider 112 to verify the digital signatures. The membership service provider 112 may associate the public keys of the federation of nodes may be associated with identifiers for the federation of nodes. The data receiver may access the public keys from the membership service provider 112 based on the identifiers for the federation of nodes.

The data furnisher 108 may communicate the token data to the data receiver (414). In some examples, the token request received by the data furnisher 108 may include a request to share the data. In such examples, the token data may remain unlocked on the blockchain 106. Alternatively, the token request may include a request to export the token data. In response to request to export the token data, the data furnisher 108 may lock the token data on the blockchain 106 (416).

Figure 5:
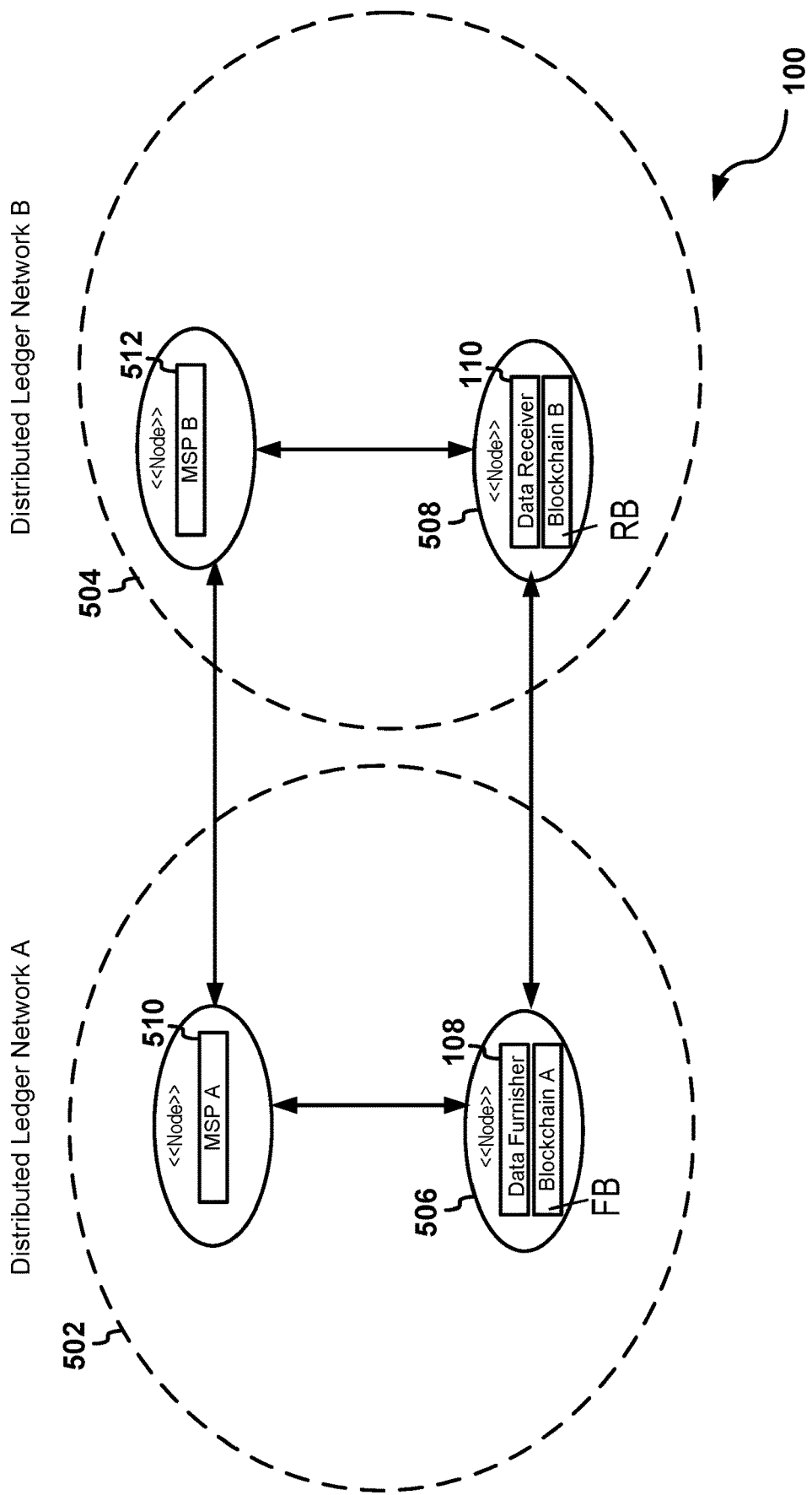
FIG. 5 illustrates a second example of an interoperable cryptologic blockchain system.

FIG. 5 illustrates a second example of the interoperable cryptologic blockchain system 100. In some examples, the system 100 may include multiple DLT networks. For example, the system 100 may include a furnisher DLT network 502 and/or a receiver DLT network 504. The furnisher DLT network 502 and/or the receiver DLT network 504 may each be examples of the DLT network 104 illustrated in FIG. 1.

The furnisher DLT network 502 may include a furnisher node. The furnisher node 506 may refer to at least one of the nodes 102 (FIG. 1) that includes and/or accesses the data furnisher 108. The receiver DLT network 504 may include a receiver node 508. The receiver node may refer to at least one of the nodes 102 that includes and/or accesses the data receiver 110.

The furnisher DLT network 502 is illustrated with one node, but the furnisher DLT network 502 may, in other examples, include multiple nodes that include respective data furnishers. Likewise, the receiver DLT network 504 may include multiple nodes that include corresponding data receivers.

The data furnisher 108 may store and/or access a furnisher blockchain. The data receiver 110 may store and/or access a receiver blockchain. The furnisher blockchain and the receiver blockchain may each be managed and maintained according to the respective DLT for each DLT network. The DLT for the furnisher DLT network 502 may be different that the DLT for the receiver DLT network 504.

The data furnisher 108 may share and/or export token data with the data receiver 110. In some examples, multiple nodes of the furnisher DLT network 502 may have an interest in the token data. The data receiver 110 may determine whether all data furnishers have agreed to share or export the token data from the furnisher DLT network 502. The data receiver 110 and the data furnisher 108 may apply cryptological security to ensure the secure, authorized, and synchronized transferring of information between DLT networks. For example, the data furnisher 108 and/or other nodes of the furnisher DLT network 502 may each generate a digital signature based on a private key and public key pair.

In some examples, the one or more nodes of the furnisher DLT network 502 may include a furnisher MSP 510. Alternatively or in addition, one or more nodes of the receiver DLT may include a receiver MSP 512. The furnisher MSP 510 and the receiver MSP 512 may exchange the public keys and/or identities of the nodes of each respective DLT network. The furnisher MSP 510 may store the public keys and/or identities of nodes of the furnisher DLT network 502 and the receiver DLT network 504. The receiver MSP 512 may or store the public keys and/or identities of nodes of the receiver DLT network 504 and the furnisher DLT network 502.

In some examples, nodes of the furnisher DLT network 502 and/or the receiver DLT network 504 may apply a consensus protocol to reach consensus regarding verifying token data stored on the blockchain, authorizing sharing of token data and/or authorized exporting of token data between DLT networks. For example, multiple nodes of the receiver DLT network 504 may have an interest in data being shared or exported from the furnisher DLT network 502. Alternatively or in addition, multiple nodes of the furnisher DLT network 502 may have an interest in data received by the receiver DLT network 504. The nodes of the receiver DLT network 504 may acquire certifications of the token data from one or more nodes of the furnisher DLT network 502.

In an example, the nodes of the furnisher DLT network 502 may include, for example, branches of a bank that wish to transfer digital currency. The nodes of the receiver DLT network 504 may include nodes that wish to receive digital currency from the furnisher DLT network 502. The bank branches of the furnisher DLT network 502 may reach consensus before transferring the digital currency to one or more bank branches of the receiver DLT network 504. Alternatively or in addition, the bank branches of the receiver DLT network 504 may wish to reach consensus on receiving the digital currency.

Figure 6:
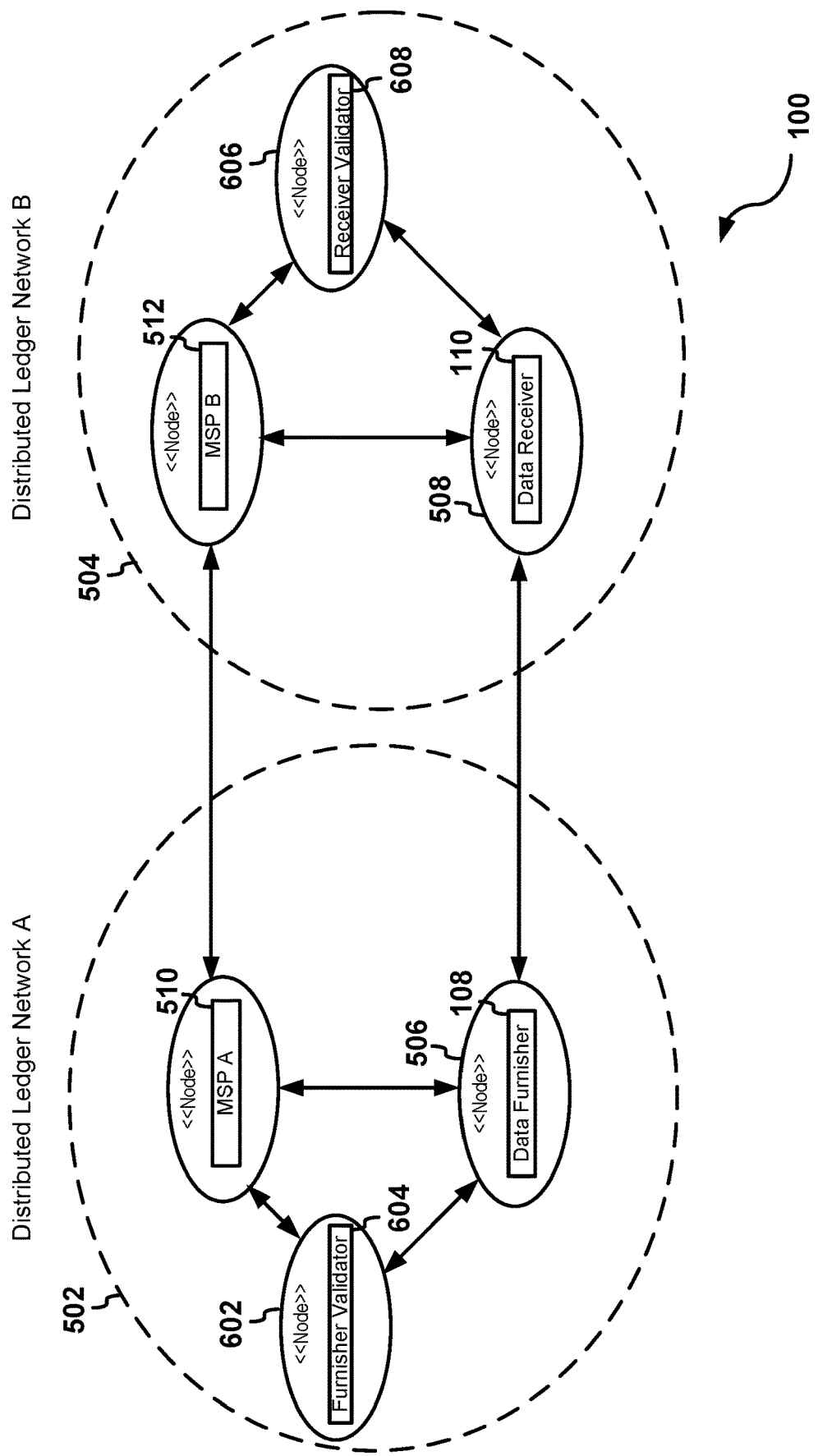
FIG. 6 illustrates a third example of an interoperable cryptologic blockchain system.

FIG. 6 illustrates a third example of the interoperable cryptologic blockchain system 100. The furnisher DLT network 502 may include a furnisher validator node 602, or multiple furnisher validator nodes. The furnisher validator node 602 may include a full or partial node of the furnisher DLT network 502. The furnisher validator node 602 may include a blockchain node described in reference to FIG. 1. The furnisher validator node 602 may add information, update information, and/or otherwise access information on the local blockchain in a manner compliant with the furnisher DLT network 502. Alternatively or in addition, the furnisher validator node 602 may synchronize and/or validate its local blockchain(s) with other full or partial nodes of the furnisher DLT network 502 in a manner that compliant with the furnisher DLT.

The furnisher validator node 602 may include a furnisher validator 604. The furnisher validator 604 may certify that token data is stored and/or locked on the furnisher blockchain. Alternatively or in addition, the furnisher validator 604 may provide validation of certifications made by other DLT networks during the process of sharing or exporting data between DLT networks. The furnisher validator 604 may communicate with one or more nodes of the furnisher DLT network 502 to certify token data stored and/or locked on the furnisher blockchain. For example, the furnisher validator 604 may detect that consensus is being requested. In some examples, the furnisher validator 604 may receive a consensus request via a communications channel, such as a message broker, a RESTful interface, or some other suitable communications interface. Alternatively or in addition, the furnisher validator 604 may detect activity on the furnisher blockchain, such as a request to share or export data, and, in response, provide consensus that the token data is stored and/or locked on the blockchain.

The furnisher validator 604 may generate a digital signature to certify the token data and/or authorize the token data from the furnisher DLT network 502 to be shared and/or exported. For example, the furnisher validator 604 may generate a private key that is paired with a public key. The furnisher validator node 602 may sign and/or generate a digital signature based on the private key. The furnisher validator 604 may communicate the public key to the furnisher MSP 510, or some other MSP or service, depending on the implementation.

The receiver DLT network 504 may include a receiver validator node 606, or multiple furnisher validator nodes. The receiver validator node 606 may include a full or partial node of the receiver DLT network 504. For example, the receiver validator node 606 may include a copy of one or more blockchain compliant with the receiver DLT. The receiver validator node 606 may add information, update information, and/or otherwise access information on the local blockchain in a manner compliant with the receiver DLT network 504. Alternatively or in addition, the receiver validator node 606 may synchronize and/or validate its local blockchain(s) with other full or partial nodes of the receiver validator node 606 in a manner that is compliant with the receiver DLT.

The receiver validator node 606 may include a receiver validator 608. The receiver validator may generate a digital signature that indicates the receiver validator node 606 consents to the certification of the furnisher validator nodes and the information being shared with and/or imported by the receiver DLT network 504. For example, the receiver validator 606 may generate a private key that is paired with a public key. The receiver validator 606 may generate a digital signature based on the private key. The receiver validator 606 may communicate the public key to the receiver MSP 512, or some other MSP or service, depending on the implementation. The receiver validator 606 may communicate an identifier of the of receiver validator 606 such that the MSP establishes a searchable association between the public key and the identity of the receiver validator 606.

Figure 7:
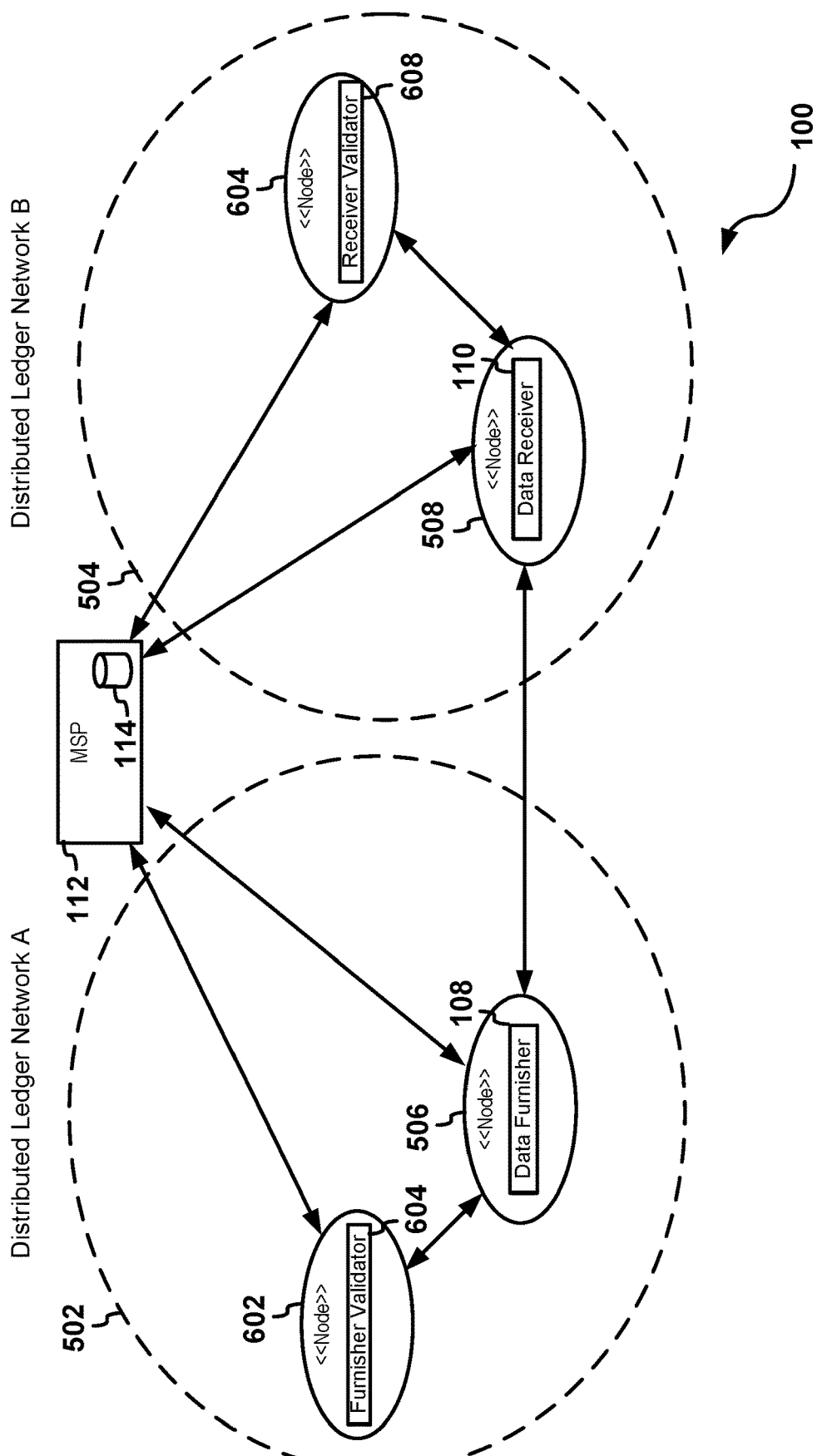
FIG. 7 illustrates a fourth example of an interoperable cryptologic blockchain system.

FIG. 7 illustrates a fourth example of the interoperable cryptologic blockchain system 100. In the example illustrated in FIG. 7, the membership service provider 112 may be shared between multiple DLT networks. For example, nodes of the furnisher DLT network 502 and/or the receiver DLT network 504 may communicate public key and identify information to the membership service provider 112. The public key and/or identity information may be stored in the membership service repository 114. Alternatively or in addition, nodes of the furnisher DLT network 502 and/or the receiver DLT network 504 may access the membership service provider 112 to receive the identity information and/or the public key information. The membership service provider 112 may be external to both the furnisher DLT network 502 and/or the receiver DLT network 504. Alternatively, the membership service provider 112 may be configured on a full or partial node of the furnisher DLT network 502 and/or the receiver DLT network 504.

Figure 8:
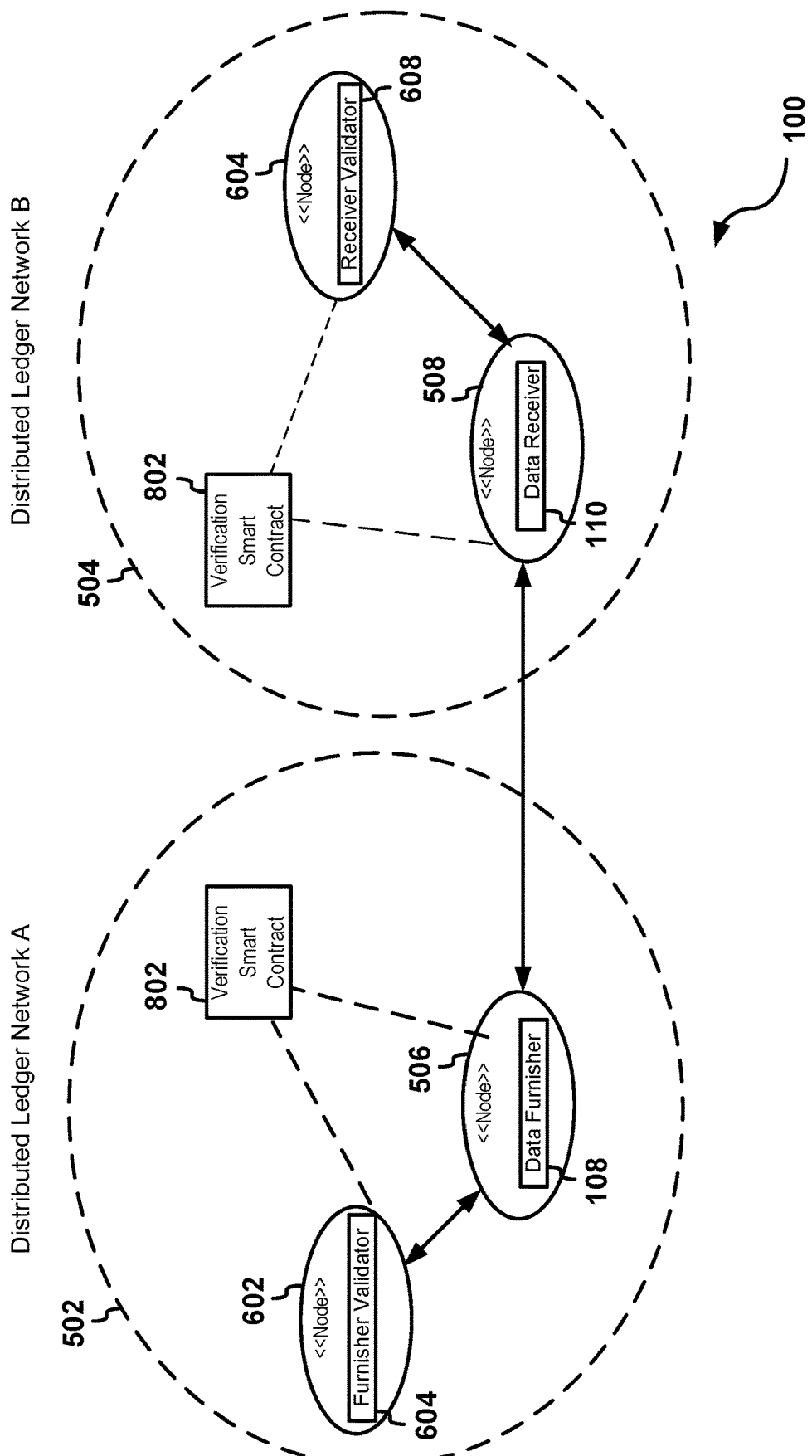
FIG. 8 illustrates a fifth example of an interoperable cryptologic blockchain system.

FIG. 8 illustrates a fifth example of the interoperable cryptologic blockchain system 100. In some examples, the nodes of the receiver DLT network 504 may access a verification smart contract 802 to verify a digital signature provided by one or more nodes of the furnisher DLT network 502.

The verification smart contract 802 may include parameters and self-executable logic. For example, the verification smart contract 802 may include the public keys and/or the identifiers of the nodes of the furnisher DLT network 502. The nodes of the receiver DLT network 504 may access the public keys from the verification smart contract 802. For example, the receiver validator 608 of the receiver validator node 606 may receive a digital signature signed by the furnisher node 506 based on a private key. A public key stored in the verification smart contract may correspond to the private key. The receiver validator 608 may access the public key from the verification smart contract 802 to verify that the furnisher node 506 signed the digital signature.

DLT networks engaged in interoperability may have access to a local copy of the verification smart contract 802. For example, the furnisher DLT network 502 may have access a corresponding version of the verification smart contract 802 that the receiver DLT 504 access. The verification smart contract 802 may be stored on the blockchains of each respective DLT network. Alternatively or in addition, the verification smart contract may be installed in some other data source within each respective DLT network. Accordingly, nodes of each DLT network may access their own verification smart contract, which behaves the same way, but exposes a different set of identities, such as foreign public keys that are needed to recognize foreign digital signatures.

In some examples, the verification smart contract 802 may include self-executing logic that causes a node of the receiver DLT network 504 to verify one or more digital signatures. For example, the self-executing logic may receive one or more digital signatures and verify the digital signatures based on public keys included in the verification smart contract 802 or stored in a location referenced by the verification smart contract 802.

One or more nodes of the furnisher DLT network 502 may provide the verification smart contract 802 to the receiver DLT network 504. For example, the furnisher node 506 may communicate the verification smart contract 802 to the receiver DLT network 504, in an off-chain manner prior to establishing interoperability between the DLT networks. One or more nodes of the receiver DLT network 504 may consent to the verification smart contract 802. In some examples, the verification smart contract 802 may include the identifiers of the nodes of the receiver DLT network 504 that should consent to the verification smart contract 802. In some examples, the verification smart contract 802 may be stored on the receiver blockchain, which is replicated between nodes of the receiver DLT network 504. In other examples, the verification smart contract 802 may be accessible to the nodes of the receiver DLT network 504 via some other communication channel or storage medium.

In some implementations, the digital signatures and/or the multi-signature message sent from the furnisher DLT network 502 may follow some proprietary format. By way of the verification smart contract 802, the furnisher DLT network 502 may provide the self-executing verification logic that is used by other DLT networks to interoperate with the furnisher DLT network 502. The self-executing logic of the verification smart contract 802 may include logic that verifies one or more digital signature provided by the furnisher DLT network 502, even when the format of the digital signatures or multi-signature certification message is native to the furnisher DLT network 502.

Figure 9:
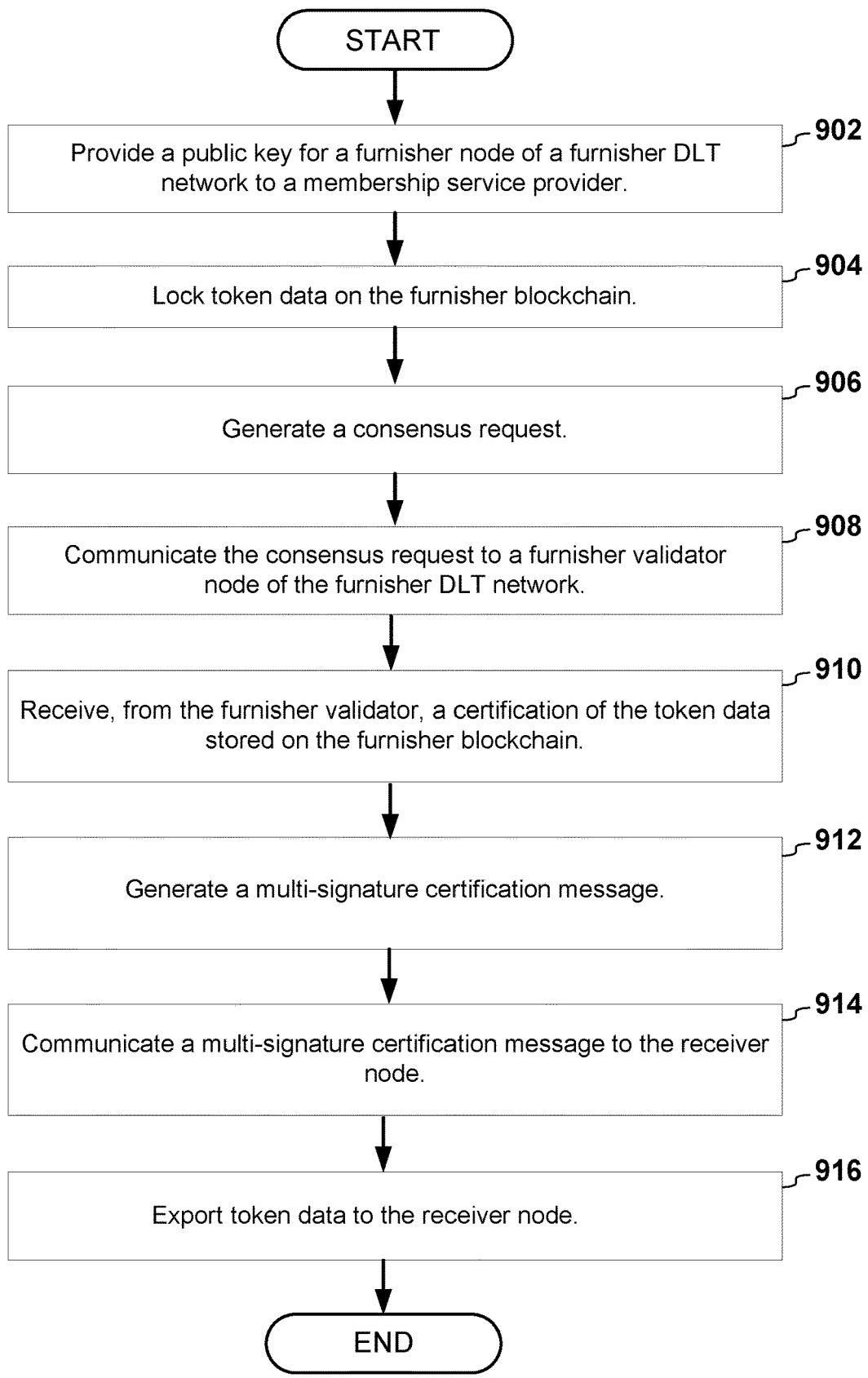
FIG. 9 illustrates a fourth example of a flow diagram for logic of an interoperable cryptologic blockchain system.

FIG. 9 illustrates a fourth example of a flow diagram for logic of the interoperable cryptologic blockchain system 100. The furnisher node 506 of the furnisher DLT network 502 may provide a public key of the furnisher node 506 to the membership service provider 112 (902). The public key may be paired with a private key for the furnisher node 506. The furnisher node 506 may sign a digital signature based on the private key. The signatures may be verified with the public key of the furnisher node 506. The membership service provider 112 may store a plurality of public keys and/or identities corresponding to the nodes of the furnisher DLT network 502. For example, the nodes of the furnisher DLT network 502 may include the furnisher node 506, a furnisher validator node 602, and/or other nodes of the furnisher DLT network 502.

The furnisher node 506 of the furnisher DLT network 502 may lock token data within the furnisher DLT network 502 (904). The token data may correspond to data to be exported from the furnisher DLT network 502. The furnisher node 506 may lock the token data by adding a data block to the furnisher blockchain in accordance with the furnisher DLT. The datablock may indicate that the token data is locked. The furnisher node 506, and/or other nodes of the furnisher DLT network 502, may restrict certain information being appended to the furnisher blockchain in response to the token data being locked. Alternatively or in addition, the nodes of the furnisher DLT network 502 may invalidate additional datablocks comprising update information corresponding to the token data.

The furnisher node 506 may generate a consensus request (906). The consensus request may include a request to validate the token data stored on the furnisher blockchain and gather validator signatures. The consensus request may be indicative of the token data stored on the furnisher blockchain. For example, the consensus request may comprise an identifier of the token data and/or information that may identify the token data in the furnisher blockchain.

The furnisher node 506 may communicate the consensus request to the furnisher validator node 602 (908). For example, the furnisher node 506 may communicate the consensus request to the furnisher validator node 602 via a communication channel between the furnisher node 506 and the furnisher validator node 602, such as a message broker, a RESTful HTTP calls, or some other medium or protocol. Alternatively or in addition, the furnisher node 506 may communicate the consensus request to the furnisher validator node 602 via the furnisher blockchain. For example, the furnisher node 506 may append a datablock to the furnisher blockchain. The datablock may include the consensus request. The furnisher validator node 602 may detect the datablock on a local copy of furnisher blockchain and then respond to the request.

The furnisher node 506 may receive a certification of the token data (910). For example, the furnisher validator node 602 may communicate the certification to the furnisher node 506 via a communication channel between the furnisher node 506 and one or more furnisher validator nodes. Alternatively or in addition, the furnisher validator 604 may communicate the certification directly to the receiver node 508. The certification may include a digital signature signed by the furnisher validator node 602 based on a private key for the furnisher validator node 602. The furnisher validator node 602 may have previously communicated a corresponding public key to a membership service provider, and/or some other source that is accessible to the receiver node 508.

The furnisher node 506 may generate a multi-signature certification message (912). For example, the furnisher node 506 may determine that the furnisher validator node 602, or a federation of furnisher validator nodes, have provided corresponding certifications to export the token data.

In response to determination that all of the furnisher validator nodes have certified the token data, the furnisher node 506 may generate the multi-signature transfer message. The multi-signature certification message may include the digital signatures of one or more node of the furnisher DLT network 502. In some examples, the multi-signature certification message may also include the token data to be shared or transferred. In other examples, the token data is communicated separately. The multi-signature certification message may reference or identify the token data to be transferred.

The furnisher node 506 may communicate the multi-signature certification message to the receiver node 508 (914). The receiver node 508 may be external to the furnisher DLT network 502. For example, the receiver node 508 may be a device that is not a full or partial node of the furnisher DLT network 502. Alternatively or in addition, the receiver node 508 may include a node of another blockchain. For example, the receiver node 508 may be a node of the receiver DLT network 504.

The furnisher node 506 may share and/or export the token data to the receiver node 508 (916). For example, the furnisher node 506 may communicate the token data with the multi-signature transfer message. Alternatively or in addition, the furnisher node 506 may communicate the token data separate from the multi-signature certification message. In other examples, the furnisher node 506 may generate an instruction to access the token data from the furnisher blockchain. The instruction may cause the receiver node 508 to communicate with the furnisher node 506, or some other node of the furnisher DLT network 502. For example, the receiver node 508 may execute the instruction and communicate a request to receive the token data. The furnisher node 506 may access, in response to receiving a request from the data receiver 110 based on the instruction, the token data from a plurality of datablocks included in the furnisher blockchain. The furnisher node 506 may communicate the token data to the receiver node 508.

In some examples, the furnisher node 506 may receive a transfer token from the data receiver 110. The transfer token may be included to the receiver blockchain compliant with the receiver DLT network 504. The furnisher node 506 may include the transfer token with the multi-signature certification message and/or the token data communicated to the receiver node 508. The receiver node 508 may determine, based on the transfer token, whether the transfer token has been previously spent before authorizing receipt of the token data from the furnisher DLT network 502. The receiver node may prohibit and/or invalidate duplicate token data received from the furnisher DLT in response to existence of the transfer token on the receiver blockchain. Alternatively or in addition, the nodes of the furnisher DLT network 502 may prohibit additional sharing and/or exporting of the token data in response to the transfer token existing on the furnisher blockchain.

Figure 10:
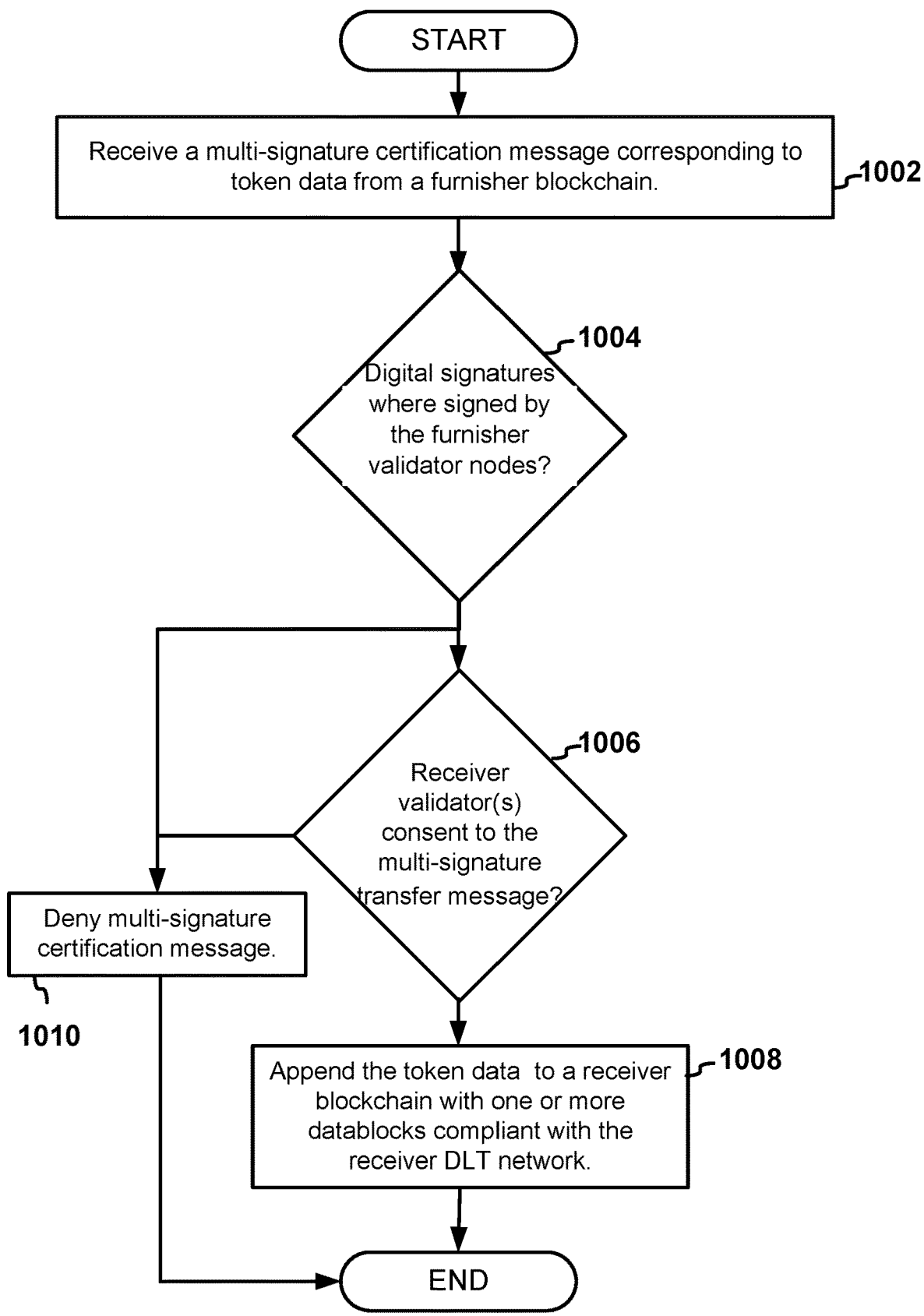
FIG. 10 illustrates a fifth example of a flow diagram for logic of an interoperable cryptologic blockchain system.

FIG. 10 illustrates a fifth example of a flow diagram for logic of the interoperable cryptologic blockchain system 100. The receiver node 508 of the receiver DLT network 504 may receive a multi-signature certification message corresponding to token data from a furnisher blockchain (1002). The multi-signature certification message may include a certification of the token data stored on the furnisher blockchain. The certification may comprise a one or more digital signatures respectively generated by a federation of nodes of the furnisher DLT network 502 and/or a multi-signature signed by each node in the federation of nodes.

The receiver node 508 of the receiver DLT network 504 may determine whether the digital signatures where signed by one or more nodes (1004) of the furnisher DLT network 502. In some examples, the receiver node 508 may determine whether all of the furnisher validator nodes, or a particular subset of all of the nodes of the furnisher DLT network 502, signed a corresponding digital signature in the multi-signature certification message.

Depending on the implementation, determination of whether the digital signatures where signed by one or more furnisher validator nodes may occur in a variety of manners. For example, the receiver node 508 may access, from a MSP, public keys that correspond to the private keys created by the furnisher validators of the furnisher DLT network 502. In some examples, the multi-signature certification message may include identifiers of the nodes of the furnisher DLT network 502. The receiver node 508 may communicate identifiers of the furnisher validator nodes to the MSP and the MSP may provide the public key(s) of the furnisher validator(s).

In another example, the receiver node 508 may access a validation smart contract. The validation smart contract may be previously created and include the identifiers of nodes of the furnisher DLT network 502 and/or the public keys of the one or more nodes. In some examples, the validation smart contract may be stored on the receiver block chain or otherwise accessible to the receiver node 508 and/or other nodes of the receiver DLT network 504.

The receiver node 508 of the receiver DLT network 504 may determine whether the receiver validator(s) consent to the multi-signature certification message (1006). For example, nodes of the receiver DLT network 504 may have an interest in ensuring that the federation of nodes of the furnisher DLT network 502 certify the token data. Alternatively or in addition, the nodes of the receiver DLT network 504 may have an interest in ensuring that the token data a share or transfer of token data is authorized by one or more nodes of the furnisher DLT network 502. In some examples, the receiver node 508 of the receiver DLT network 504 may communicate a consensus request to one or more receiver validator node of the receiver DLT network 504. The consensus request may include the at least one of the digital signatures created by the nodes of the furnisher DLT network 502. The receiver validator 606 may verify that the digital signature(s) were signed by the nodes of the furnisher DLT network 502. For example, the receiver validator 606 may access public keys from an MSP and determine, based on the public keys, that the digital signatures were signed by the nodes of the furnisher DLT network 502. Alternatively or in addition, the receiver validator may access a smart contract comprising the public keys of the nodes.

The receiver node 508 may receive consensus verification message(s) created by the receiver validator node(s). For example, the consensus verification message may include a verification that the at least one of the digital signatures was signed by at least one of the nodes of the furnisher DLT network 502. Alternatively or in addition, the consensus verification message may include a verification that all of the digital signatures were signed by the furnisher validators of the furnisher DLT network 502. In some examples, the consensus verification message may include the identifiers and/or public keys of the nodes of the furnisher DLT network 502 that signed the digital signatures. Alternatively or in addition, the consensus verification message may include a second digital signature signed by the receiver validator node 606 based on a private key of the receiver validator node 606.

In some examples, the consensus verification message may be communicated via a communication channel to the receiver node 508. In other examples, the consensus verification message may be communicated via the receiver blockchain. For example, the receiver validator node 606 may append, to the blockchain, one or more datablocks comprising the consensus verification message. The receiver node 508 may detect that the consensus verification message was added to a local instance of the receiver blockchain.

In response to determination that the digital signatures were signed by the furnisher validator nodes (1004, Yes), and/or in response to determination that the receiver validator nodes 606 consent to the multi-signature certification message (1006, Yes), the receiver node 508 may append the token data to a receiver blockchain with one or more datablocks compliant with the receiver DLT network 504 (1008). For example, the receiver node 508 may append a datablock comprising the token data. The datablock may comprise a hash of a previous datablock of the receiver blockchain, or a portion thereof.

In response to determination that the digital signatures were not signed by the furnisher validator nodes (1004, No), and/or in response to determination that the receiver validator nodes 606 do not consent to the multi-signature certification message (1006, No), the receiver node 508 may deny the multi-signature certification message (1010). For example, the receiver node 508 may ignore or the token data and/or cancel a transaction involving the token data.

In many of the examples, of the system and methods of DLT interoperability described herein, communication occur between a "receiver" DLT network and a "furnisher" DLT network. The terms "receiver" and "furnisher" were used for clarity but are not intended to limit flow information between DLT networks or the number of DLT network in which interoperability occurs. For example, nodes of the furnisher DLT network 502 may receive information from the receiver DLT network 504 and nodes of the receiver DLT network 504 may furnish information to the furnisher DLT network 502.

Figure 11:
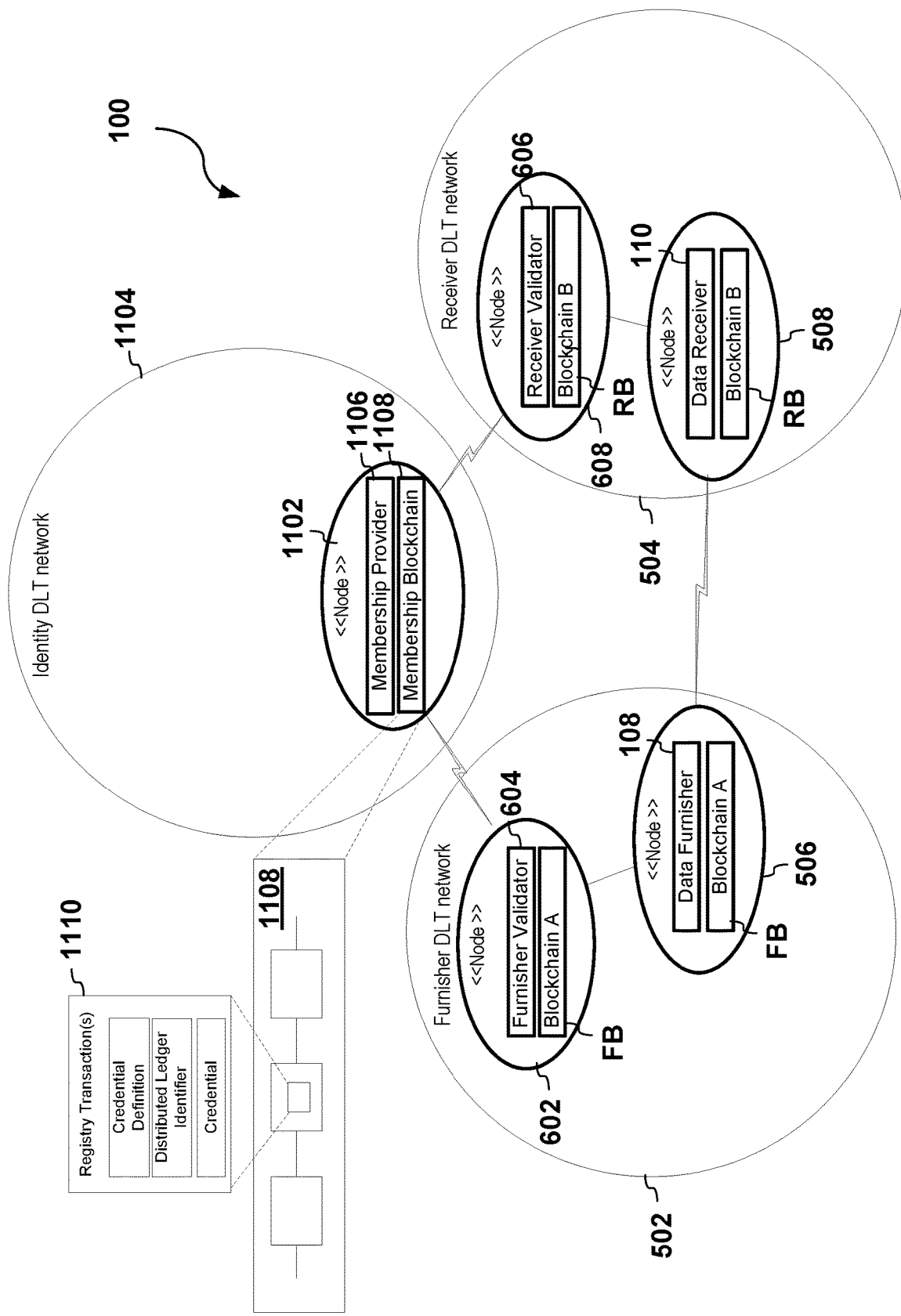
FIG. 11 illustrates a sixth example of an interoperable cryptologic blockchain system.

FIG. 11 illustrates a sixth example of an interoperable cryptologic blockchain system 100. The system 100 may include a membership node 1102. The member node 1102 may be a node of a membership DLT network 1104. The membership node 1102 may include a membership provider 1106 and a membership blockchain 1108.

The membership blockchain 1108 includes a registry for distributed ledgers. For example, the membership blockchain 1108 may store registry transaction(s) 1110, and updates thereto, in one or more transactions on the membership blockchains.

In some examples, the registry transaction(s) 1110 include a distributed ledger identifier. The distributed ledger identifier may include an identifier of a distributed ledger and/or a DLT network by which a distributed ledger is validated. In some examples, the distributed ledger identifier may be generated by the membership provider 1106 and validated by the requesting DLT network. For example, the furnisher validator 604 may request creation of a distributed ledger identifier for the furnisher DLT network 502. The membership provider 1106 may generate a unique identifier for the furnisher DLT network 502 and/or the furnisher blockchain. The furnisher validators may certify the registry transaction(s) 1110 by digitally signing a certification of the unique identifier.

Alternatively or in addition, the registry transaction(s) 1110 may include a credential definition. The credential definition may include information that identifies one or more nodes of a distributed ledger network that will issue and certify credentials to the membership blockchain. For example, the credential may include identifiers, public keys, and other identifying information for one or more nodes of a DLT network that will issue validator credentials for the DLT network.

The registry transaction(s) may include a credential (or multiple credentials). The credential may include, for example, the identifying information for a validator node for a DLT network. For example, the credential definition may include an identifier of a node, an address of a node (i.e. a memory address or network address), and/or other information that uniquely identifies and/or designates a node). Alternatively or in addition, the credential may include information that assists in proving or validating certifications made by one or more validator. For example, the credential may include a public key for a validator. The public key may be paired with a corresponding private keys accessible only to the validator. For example, a private key may be accessible to a validator but not stored on a blockchain or otherwise publically accessible to other entities. The public key corresponding to the private key may be stored on the membership blockchain. A validator may cryptologically certify information based on the private key. Other entities may verify the validator certified the information based on the public key corresponding to the private key.

In some examples, registry transaction(s) 1110 may include a mapping between the credential definition, a distributed ledger identifier, the credential, or a combination thereof. The credential definition and/or the credential may be identified on the membership blockchain 1108 based on the distributed ledger identifier. In some examples, the membership provider 1106 may provide an application-programming interface (API), or some other suitable communications interface, whereby the credential or credential definition may be created, stored, updated, and/or identified based on the distributed ledger identifier. For example, the nodes of a distributed ledger network may generate a query request comprising the distributed ledger identifier. The membership provider 1106 may respond to the query request and search the membership blockchain 1108 for the latest version of the credential or credential definition associated with the distributed ledger identifier.

When the registry transaction(s) 1110 is created or updated, the registry transaction(s) 1110, or modifications there to, may be submitted in a transaction to a consensus protocol from the membership DLT network. For example, the membership provider 1106 may access a blockchain platform (e.g. QUORUM or FABRIC) which provides an API for appending information to the blockchain. The registry transaction(s) 1110 may be replicated across multiple corresponding blockchains of the distributed ledger for the membership DLT network.

The registry transaction(s) 1110 may be certified by one or more validators of a DLT network separate from the membership DLT network. For example, a quorum of validators of the furnisher DLT network 502 may digitally sign registry transaction(s) 1110, or a portion thereof, for the furnisher DLT network 502 or generate a multi-signature certification of the registry transaction(s) 1110, or a portion thereof. The multi-signature certification may be stored on the membership blockchain 1108 to signify approval of the registry transaction(s) 1110. It should be appreciated that receiver validators of the receiver DLT network 504 may mirror these operations to signify approval of distributed ledger identity for the receiver DLT network 504.

As defined herein, a quorum refers to a group of nodes that provide validation of the same event or fact. The quorum may include a minimum number of nodes needed to establish consensus. In some examples, the minimum number, or criteria for identifying a quorum, may be stored in the credential definition. For example, the credential definition may include a threshold value that established included in a criteria for determining a quorum.

Figure 12:
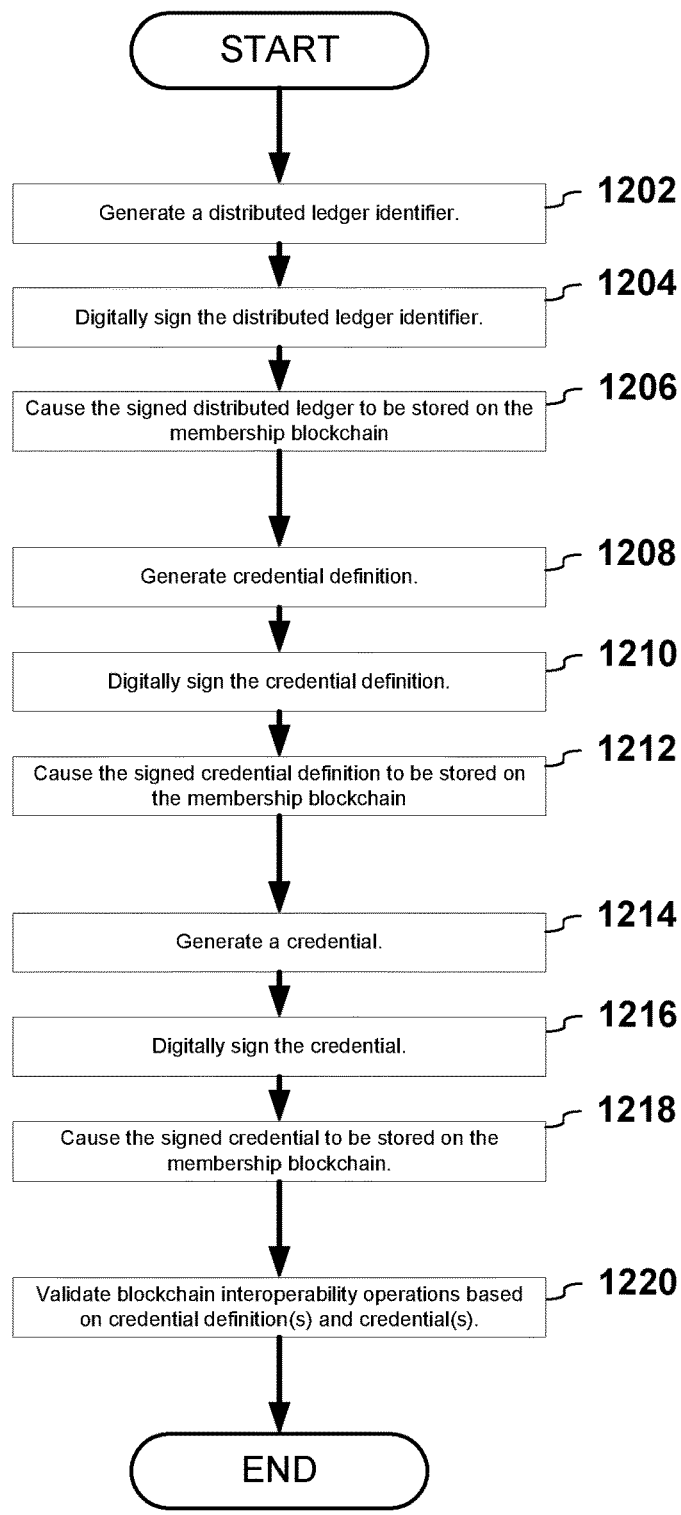
FIG. 12 illustrates a sixth example of a flow diagram for logic of an interoperable cryptologic blockchain system.

FIG. 12 illustrates a sixth example of a flow diagram for logic of the interoperable cryptologic blockchain system 100. FIG. 12 illustrates various operations that may be executed by a validator of a distributed ledger network. The validator may include, for example, the furnisher validator 602, the receiver validator 606 and/or other validator(s) of DLT network(s).

Operations 1202-1206 shown in FIG. 12 refer to operations involved in establishing distributed ledger identity. The validator and/or membership provider 1106 may generate a distributed ledger identifier (1202). In some examples, the validator may cause the distributed ledger identifier to be stored on the membership blockchain 1108. For example, the validator may communicate with the membership provider 1106 to generate a transaction comprising the distributed ledger identifier. In some examples, the membership provider 1106 may generate a unique value for the distributed ledger identifier.

The validator may digitally sign the distributed ledger identifier (1204). Alternatively or in addition, the validator may digitally sign a transaction information that that includes the distributed ledger identifier.

The validator may cause the signed distributed ledger identifier to be stored on the membership blockchain 1108 (1206). For example, the validator may communicate the signed distributed ledger identifier to the membership provider 1106 for storage on the membership blockchain 1108. Alternatively or in addition, the validator may access the membership blockchain 1108 directly and store the signed identifier on the membership blockchain 1108. In some examples, the signed distributed ledger identifier may be submitted in a transaction that is validated based on a consensus protocol from the membership DLT network.

Operations 1208-1212 refer to operations involved in registering a credential definition. The validator may generate a credential definition (1208). For example, the validator may generate an initial credential definition. The initial credential definition may have the public key(s) for one or more validators. For example, the validator may act as an issuer and compile the public keys of multiple validators.

The validator may digitally sign the credential definition (1210). For example, the validator may encrypt the credential definition based on a private/public key pair. In some examples, multiple validators may digitally sign the credential definition to generate a multi-signature certification of the credential definition.

The validator may cause the signed credential definition to be stored on the membership blockchain 1108 (1212). The validator may communicate the signed credential definition to the membership provider 1106 for storage on the membership blockchain 1208. Alternatively or in addition, the validator may communicate with the membership blockchain 1208 directly to store the credential definition. The credential definition and/or the distributed ledger identity may be submitted to a consensus protocol for the membership DLT work. The communications between the nodes of the membership DLT network may establish consensus for the addition of the credential definition and/or distributed ledger identity to the membership blockchain 1108.

Operations 1214-1218 refer to operations involved in creating, revoking, and/or modifying a credential. The validator may generate an addition, revocation, and/or a modification for a credential (1214). The validator may digitally sign the created/modified/revoked credential (1216). Alternatively or in addition, the validator may sign the transaction that creates, modifies, or revokes the credential. In some examples, multiple validators may sign the credential (or transaction for the credential) to establish a quorum of validators that approve the addition or revocation of the credential. The validators that sign the credential may be identified in the membership blockchain. The validator(s) may cause the signed credential to be stored on the membership blockchain 1108 (1218). For example, the validator(s) may communicate the signed credential to the membership provider 1106 for storage on the membership blockchain 1108. Alternatively, a particular validator may act as an issuer and send a multi-signed credential (i.e. signed by multiple validators) to the membership provider 1106.

After the credential definition and/or credentials for a distributed ledger network is created, the validator may validate blockchain operations based on the membership blockchain(s) and/or credentials. For example, the validator may validate blockchain interoperability operations based on the respective credentials associated with the membership blockchains for each distributed ledger network involved in the interoperability.

Figure 13:
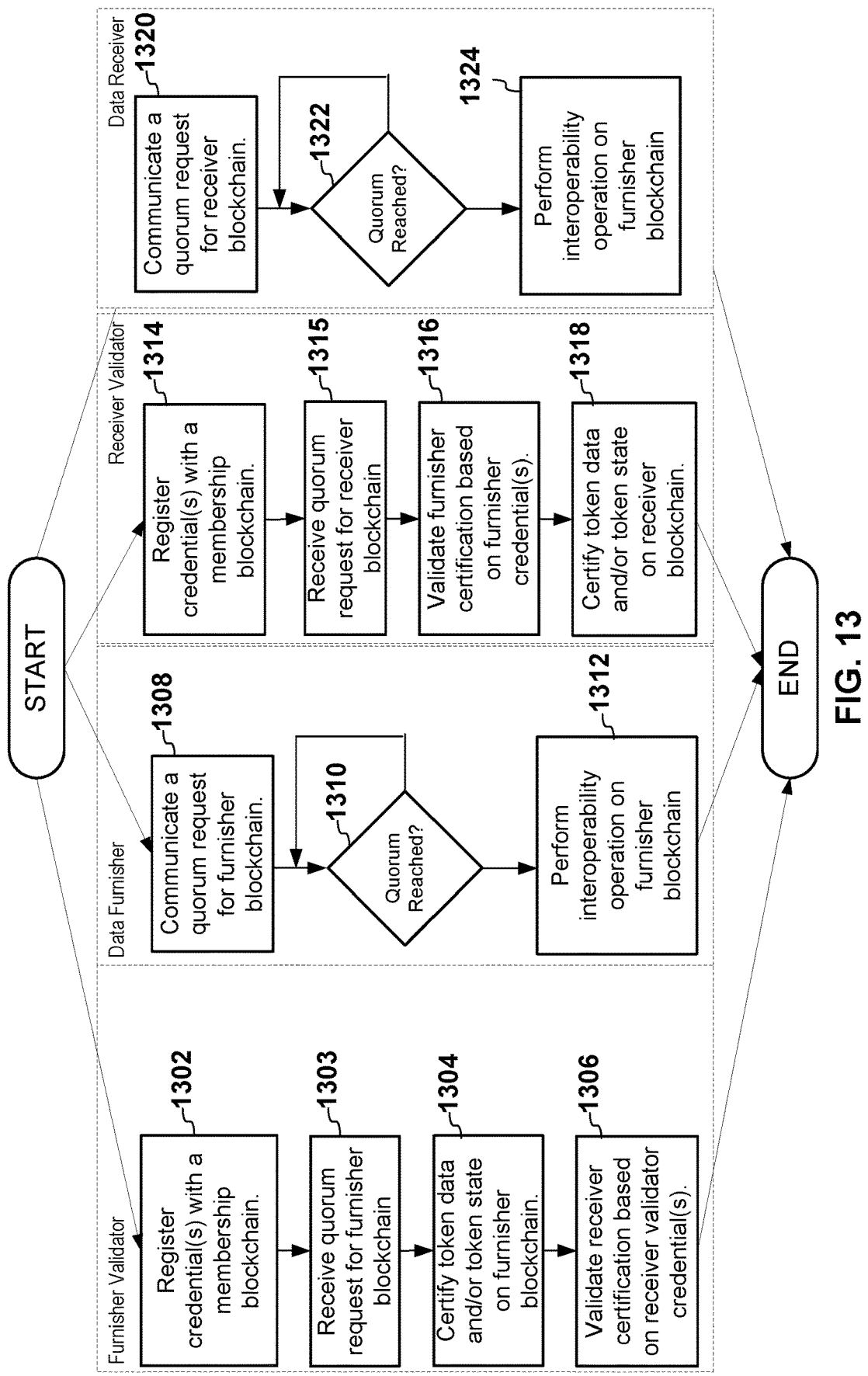
FIG. 13 illustrates a seventh example of a flow diagram for logic of an interoperable cryptologic blockchain system.

FIG. 13 illustrates a seventh example of a flow diagram for logic of the interoperable cryptologic blockchain system 100.

Operations 1302-1312 include operations executed by one or more nodes of the furnisher DLT network 502. For example, operations 1302-1306 include operations executed by the furnisher validator 604.

The furnisher validator 604 may register a furnisher credential definition and/or one or more furnisher validator credential(s) on the membership blockchain 1108 (1302). For example, the furnisher validator 604 may generate the registry transaction(s) 1110, or a portion thereof (see FIG. 11). Alternatively or in addition, the furnisher validator 604 may submit a credential for the furnisher validator 604 to the credential definition. FIG. 12 and the related discussion provides additional examples for registering a credential definition and submitting validator credentials. The credential for the furnisher validator 604 may be accessed by the receiver validator 606 to validate certifications made by the receiver validator 606 (see operation 1316 below).

The furnisher validator 604 may receive a quorum request for the furnisher blockchain (1303). For example, the furnisher validator 604 may receive a consensus request, as discussed in reference to FIG. 9. The quorum request may include a request to certify token data and/or a state of the token data (i.e. certify token data is stored on the furnisher blockchain, certify the token data is in a locked state, etc.).

The furnisher validator 604 may certify token data and/or token state on a furnisher blockchain (1304). The furnisher validator 604 may generate a certification of token data stored on the furnisher blockchain. The certification may be digitally signed based on a public and/or private key of the furnisher validator 604. For example, the certification may include information encrypted based on a private key of the furnisher validator. The public key may be used to unencrypt the certification in order to verify the furnisher validator signed the certification.

Figure 14:
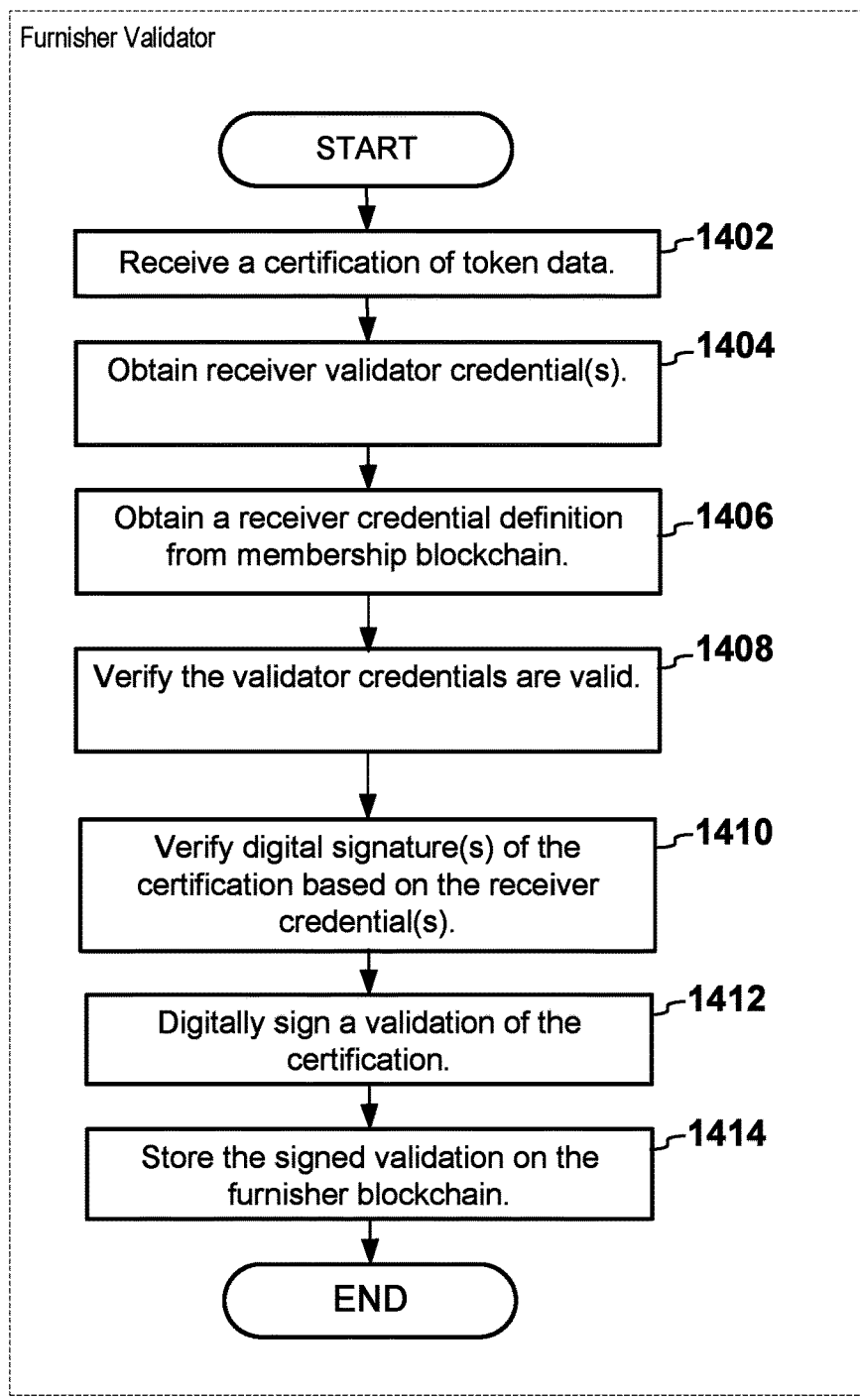
FIG. 14 illustrates a eighth example of a flow diagram for logic of an interoperable cryptologic blockchain system.

The furnisher validator 604 may validate, based on receiver credentials, certifications generated by one or more nodes of the receiver DLT network 504 (1306). Refer to FIG. 14 and the related discussion for further details regarding certification validation.

Operation 1308-1312 refer operations performed by the data furnisher 108. The data furnisher 108 may communicate a quorum request (1308). The quorum request may include a request for one or more validators to certify token data on the blockchain, validate certification(s) made by nodes of the receiver DLT network 504, or a combination thereof. In some examples, the quorum request may be communicated to each furnisher validator. Alternatively or in addition, the quorum request may be submitted to the furnisher blockchain, which is replicated by each of the furnisher validators. In some examples, the quorum request may include a certification signed by one or more nodes of the receiver DLT network 504.

In some examples, the furnisher credential definition may identify the validators of the furnisher DLT network 502. The data furnisher 108 may request the credential definition from the membership provider 1106. For example, the data furnisher 108 may generate a query for the furnisher credential definition. The query may include the distributed ledger identifier of the furnisher DLT network 502. The data furnisher 108 may communicate the query to the membership provider 1106. The membership provider 1106 may identify, on the membership blockchain 1108, the credential definition and/or credentials associated with the distributed ledger identifier. The data receiver 110 may extract validator identifiers and/or communications address info from the credential definition for each furnisher validator of the furnisher DLT network 502.

The data furnisher 108 may determine whether a quorum is reached (1310). For example, the data furnisher 108 may determine whether a threshold amount of furnisher validators have certified the token data, validated certifications made by receiver validators, or a combination thereof. In some examples, the threshold number, and/or other quorum criteria, may be specified in the credential definition. For example, the data furnisher 108 may extract the threshold number from the credential definition.

In response to a quorum not being reached (1310, no), the data furnisher 108 may wait for additional furnisher validators to certify the token data, and/or validate certifications made by the receiver validator. In response to the quorum being reached (1310, yes), the data furnisher 108 may perform an interoperability operation on the furnisher blockchain (1312). The interoperability operation on the furnisher blockchain may include any operation for sharing or exporting token data between two separate blockchains. For example, the interoperability operation may include locking the token data on the furnisher blockchain and/or communicating the token data to the data receiver 110. Other examples of the interoperability may include executing logic of one or more smart contracts for interoperability.

Operations 1314-1324 include operations executed by one or more nodes of the receiver DLT network 504. For example, operations 1302-1306 include operations executed by the receiver validator 606.

The receiver validator 606 may register a receiver credential definition and/or one or more receiver validator credential(s) on the membership blockchain 1108 (1314). For example, the receiver validator 606 may generate the registry transaction(s) 1110, or a portion thereof (see FIG. 11). Alternatively or in addition, the receiver validator 606 may generate modifications to a credential definition and/or generate a distributed ledger identity. For example, the receiver validator 606 may execute the operations identified in FIG. 12. The credential for the receiver validator 606 may be accessed by the furnisher validator 604 to validate certifications made by the furnisher validator 604 (see operation 1306 above).

The receiver validator 606 may receive a quorum request for the receiver blockchain (1315). The quorum request may include a request to certify token data and/or a state of the token data (i.e. certify token data is authorized to be imported, certify token data is stored on the receiver blockchain in a pre-committed state, etc.).

The receiver validator 606 may validate, based on furnisher credential definitions, certifications generated by one or more nodes of the furnisher DLT network 502 (1316). Refer to FIG. 14 and the related discussion for further details regarding certification validation.

The receiver validator 606 may certify token data and/or token state on the receiver blockchain (1318). For example, the receiver validator 606 may receive a consensus request, as discussed in reference to FIG. 9. The receiver validator 606 may generate a certification of token data stored on the receiver blockchain. The certification may be signed based on a public/private key pair. The public key may be stored within a credential for the receiver validator 606 on the membership blockchain 1108. The private key may be accessible only to the receiver validator 606 or not otherwise stored on the membership blockchain 1108.

Operation 1320-1324 refer operations performed by a data receiver 110. The data receiver 110 may communicate a quorum request (1320). The quorum request may include a request for one or more receiver validators to certify token data on the receiver blockchain, validate certification(s)

made by nodes of the furnisher DLT network 502, or a combination thereof. In some examples, the quorum request may be communicated to multiple receiver validators. Alternatively or in addition, the quorum request may be submitted to the receiver blockchain, which is replicated by each of the furnisher validators. In some examples, the quorum request may include the certification signed by one or more nodes of the furnisher DLT network 502.

In some examples, the receiver credential definition may identify the validators of the receiver DLT network 504. The data receiver 110 may request the credential definition from the membership provider 1106. For example, the data receiver 110 may generate a query for the receiver credential definition. The query may include the distributed ledger identifier of the receiver DLT network 504. The data receiver 110 may communicate the query to the membership provider 1106. The membership provider 1106 may identify, on the membership blockchain 1108, the credential definitions associated with the distributed ledger identifier. The data receiver 110 may extract validator identifiers and/or communications address info from the credential definition for one or more receiver validator 606 of the furnisher DLT network 502.

The data receiver 110 may determine whether a quorum is reached (1322). For example, the data receiver 110 may determine whether a threshold amount of receiver validators have certified the token data, validated certifications made by furnisher validators, or a combination thereof. In some examples, the threshold number, and/or other quorum criteria, may be specified in the credential definition. For example, the data receiver 110 may extract the threshold number from the credential definition.

In response to a quorum not being reached (1322, no), the data receiver 110 may wait for additional receiver validators to certify the token data, and/or validate certifications made by the receiver validator 606. In response to the quorum being reached (1322, yes), the data receiver 110 may perform an interoperability operation on the receiver blockchain (1324). The interoperability operation on the receiving blockchain may include any operation for importing token data from the furnisher DLT network 502. For example, the interoperability operation may include authorizing the token data to be imported on the furnisher blockchain, storing the token data on the receiver blockchain, and/or committing the token data to the receiver blockchain. Other examples of the interoperability may include executing logic of one or more smart contracts for interoperability.

FIG. 14 illustrates an eighth example of a flow diagram for logic of an interoperable cryptologic blockchain system. The logic included in FIG. 14 may be included in or executed by a furnisher validator. The example logic may illustrate operations for validating one or more receiver certification(s).

The furnisher validator 604 may receive a certification of token data (1402). The certification may have been previously signed by one or more receiver validators. For example, the certification may include a multi-signature certification.

The furnisher validator 604 may obtain receiver validator credentials (1404). The receiver validator credentials may include the credentials of the receiver validators that are purported to have signed the certification of token data. The manner in which the furnisher validator 604 obtains the receiver validator credentials may vary. In a first example, the furnisher validator 604 may obtain the receiver validator credentials directly from the membership blockchain. For example, the furnisher validator 604 may query the membership blockchain based on the identity of the receiver validators.

In another example, the furnisher validator may receive the receiver validator credentials from the data furnisher 108. By way of example, the data receiver 110 may communicate the receiver validator credentials to the data furnisher 108. The furnisher validator may submit a quorum request to multiple furnisher validator. The quorum request may include the receiver validator credentials and/or the certification of token data.

The furnisher validator 604 may obtain a receiver credential definition stored on the membership blockchain 1108 (1406). In various examples, the furnisher validator 604 may communicate with the membership provider 1106. For example, the furnisher validator 604 may submit a query to the membership provider 1106. The query may include a distributed ledger identifier for the receiver DLT network 504. The membership provider 1106 may query the membership blockchain 1108 for the credential definition mapped to the distributed ledger identifier. The furnisher validator 604 may verify the validator credentials are valid based on the receiver credentials definition (1408). The furnisher validator 604 may verify the validator credentials in various manners. In an example, the furnisher validator 604 may determine whether the credentials (or the transactions storing the credentials on the membership blockchain) are signed by one or more receiver validator identified by the receiver credential definition. For example, the receiver credential definition may include the public keys of the receiver validators that issued or certified the receiver credential.

After the receiver credential is verified, the furnisher validator 604 may verify the digital signature(s) of the receiver certification based on the receiver credential (1410). The furnisher validator 604 may determine each of the receiver validators signed the certification based on the obtained credentials. For example, the credentials may include public keys for the receiver validators. The furnisher validator 604 may determine that one or more receiver validators signed the certification based on the public keys.

The furnisher validator 604 may digitally sign a validation of the certification (1412). The validation may include information that confirms a certification is validly signed. In some examples, a validation may include the certification itself, or a data structure that includes the certification. Alternatively or in addition, the validation may include information that identifies or addresses the certification. For example, a validation may include a transaction that includes the certification or references the certification. Signing the validation may include encrypting the validation based on a private/public key pair. The public key may be used to unencrypt the validation to determine which validator signed the validation. In some examples, multiple furnisher validators may sign the validation.

The furnisher validator 604 may store the signed validation on the furnisher blockchain (1414). For example, the furnisher validator 604 may append the signed validation (or a transaction including the signed validation) to the furnisher blockchain. Alternatively or in addition, the furnisher validator 604 may submit the validation to a blockchain platform that implements a consensus protocol for the furnisher DLT network. The blockchain platform and the consensus protocol may generate consensus among multiple nodes of the furnisher DLT network 502 regarding the authenticity and/or validity of the signed validation stored by the furnisher validator 604.

Figure 15:
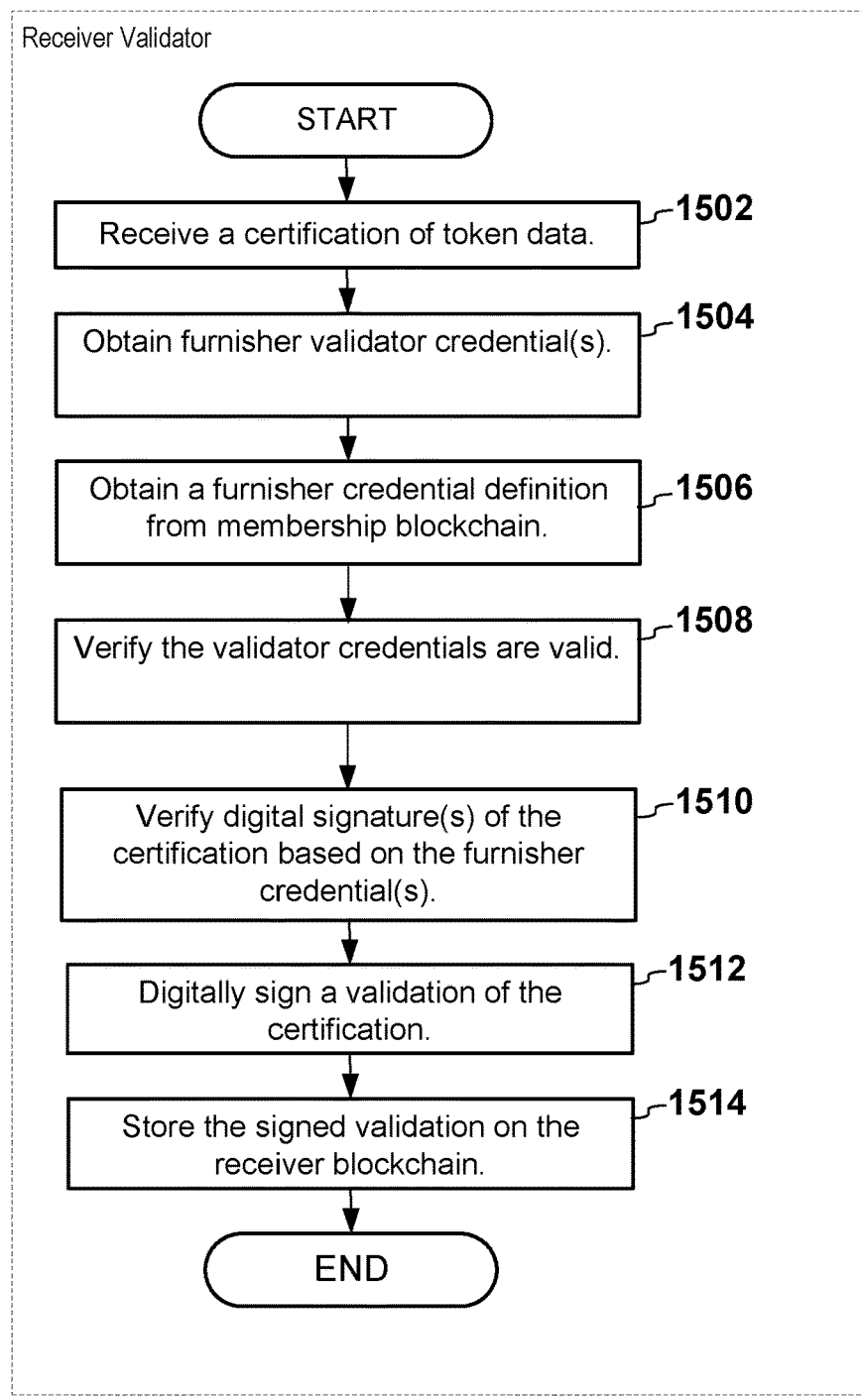
FIG. 15 illustrates an ninth example of a flow diagram for logic of an interoperable cryptologic blockchain system.

FIG. 15 illustrates a ninth example of a flow diagram for logic of the interoperable cryptologic blockchain system 100. The logic shown in FIG. 15 may illustrate logic included in (or executed by) the receiver validator 606 for validating one or more furnisher certification(s).

The receiver validator 606 may receive a certification of token data (1502). The certification may have been previously signed by one or more furnisher validators. For example, the certification may include a multi-signature certification.

The receiver validator 606 may obtain receiver validator credentials (1504). The receiver validator credentials may include the credentials of the receiver validators that are purported to have signed the certification of token data. The manner in which the receiver validator 606 obtains the furnisher validator credentials may vary. In a first example, the receiver validator 606 may obtain the furnisher validator credentials directly from the membership blockchain 1108. For example, the receiver validator 606 may query the membership blockchain based on the identity of the receiver validators.

In another example, the receiver validator 606 may receive the receiver validator credentials from the data receiver 110. By way of example, the data furnisher 108 may communicate the furnisher validator credentials to the data receiver 110 with, for example, token data that is being exported to the receiver DLT network 504. The data receiver 110 may submit a quorum request to multiple furnisher validators. The quorum request may include the furnisher validator credentials and/or the certification of token data.

The receiver validator 606 may obtain a furnisher credential definition stored on the membership blockchain 1108 (1506). In various examples, the receiver validator 606 may communicate with the membership provider 1106. For example, the receiver validator 606 may submit a query to the membership provider 1106. The query may include a distributed ledger identifier for the furnisher DLT network 502. The membership provider 1106 may query the membership blockchain 1108 for the credential definition mapped to the distributed ledger identifier.

The receiver validator 606 may verify the furnisher validator credentials are valid based on the furnisher credentials definition (1508). The receiver validator 606 may verify the furnisher validator credentials in various manners. In an example, the receiver validator 606 may determine whether the credentials (or the transactions storing the credentials on the membership blockchain) are signed by one or more furnisher validator identified by the furnisher credential definition. For example, the furnisher credential definition may include the public keys of the furnisher validators that issued or certified the furnisher credential.

After the receiver credential is verified, the receiver validator 606 may verify the digital signature(s) of the furnisher certification based on the furnisher credential definition (1510). The receiver validator 606 may determine each of the furnisher validators signed the certification based on the credentials associated with the receiver credential definition. For example, the credentials may include public keys for the furnisher validators. The receiver validator 606 may determine that one or more furnisher validators signed the certification based on the public keys.

The receiver validator 606 may digitally sign a validation of the certification (1512). For example, the validation may include a transaction that includes the certification. Signing the validation may include encrypting the validation based on a private/public key pair. The public key may be used to unencrypt the validation to determine which validator performed signed the validation. In some examples, multiple receiver validators may sign the validation.

The receiver validator 606 may store the signed validation on the receiver blockchain (1514). For example, the receiver validator 606 may append the signed validation (or a transaction including the signed validation) to the receiver blockchain. Alternatively or in addition, the receiver validator 606 may submit the validation to a blockchain platform that implements a consensus protocol for the receiver DLT work. The blockchain platform and the consensus protocol may generate consensus among multiple nodes of the furnisher DLT network 502 regarding the authenticity and/or validity of the signed validation stored by the receiver validator 606.

The logic illustrated in the flow diagrams may include additional, different, or fewer operations than illustrated. The operations illustrated may be performed in an order different than illustrated. The system 100, the interoperable node 1102, and/or the DLT network 104 may be implemented with additional, different, or fewer components than illustrated. Each component may include additional, different, or fewer components.

Figure 16:
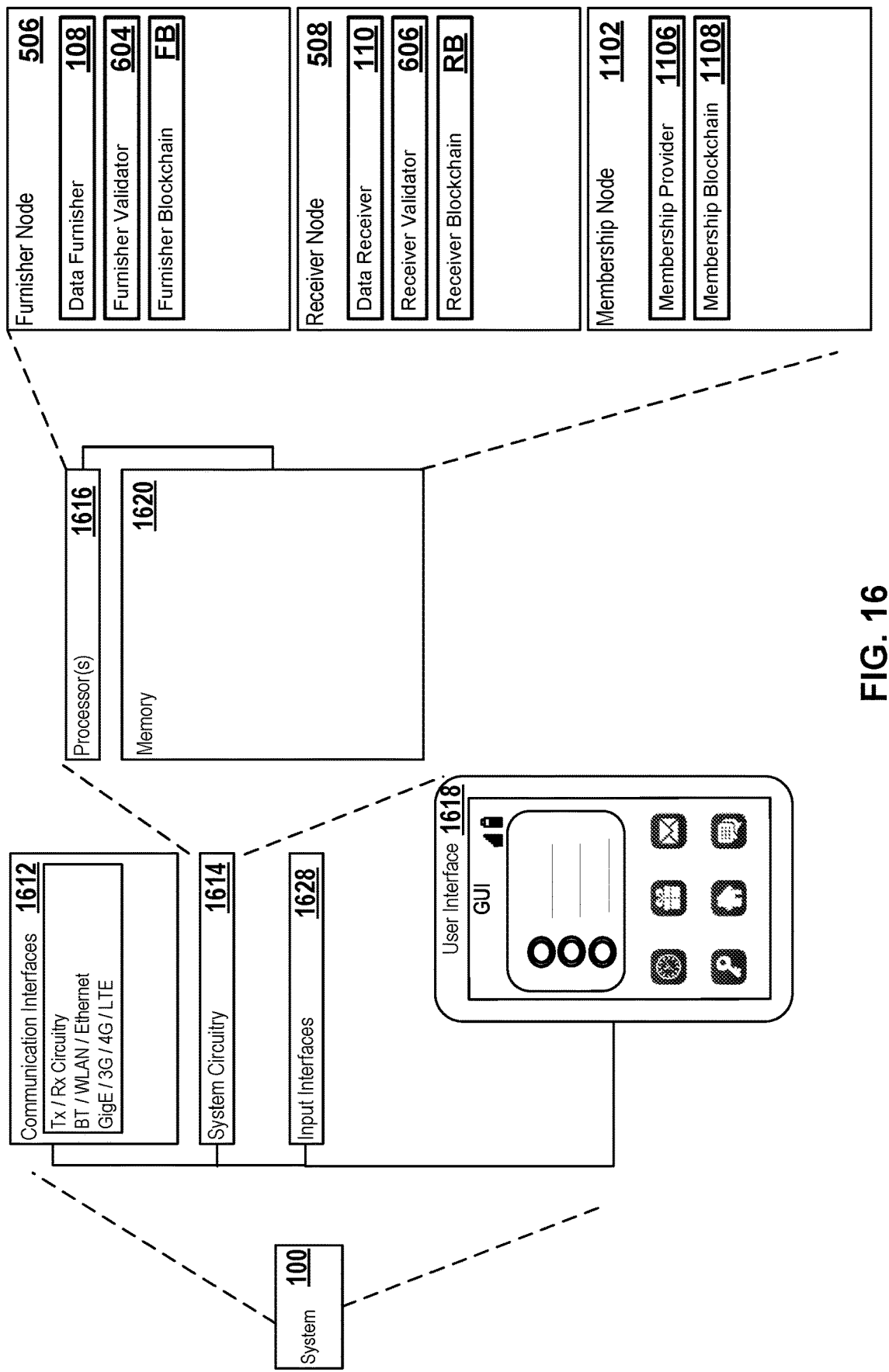
FIG. 16 illustrates a seventh example of an interoperable cryptologic blockchain system.

FIG. 16 illustrates a seventh example of the interoperable cryptologic blockchain system 100. The system 100 may include communication interfaces 1612, input interfaces 1628 and/or system circuitry 1614. The system circuitry 1614 may include a processor 1616 or multiple processors. Alternatively or in addition, the system circuitry 1614 may include memory 1620.

The processor 1616 may be in communication with the memory 1620. In some examples, the processor 1616 may also be in communication with additional elements, such as the communication interfaces 1612, the input interfaces 1628, and/or the user interface 1618. Examples of the processor 1616 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 1616 may be one or more devices operable to execute logic. The logic may include computer executable instructions or computer code stored in the memory 1620 or in other memory that when executed by the processor 1616, cause the processor 1616 to perform the operations the furnisher node 506, the furnisher validator 604, the furnisher blockchain, the data receiver 110 node 508, the data receiver 110, the receiver validator 606 606, the receiver blockchain, the membership node 1102, the membership provider 1106, the membership blockchain 1108, and/or the system 100. The computer code may include instructions executable with the processor 1616.

The memory 1620 may be any device for storing and retrieving data or any combination thereof. The memory 1620 may include non-volatile and/or volatile memory, such as a random access memory (RAM), a read-only memory (ROM), an erasable programmable read-only memory (EPROM), or flash memory. Alternatively or in addition, the memory 1620 may include an optical, magnetic (hard-drive), solid-state drive or any other form of data storage device. The memory 1620 may include at least one of the furnisher node 506, the furnisher validator 604, the furnisher blockchain, the data receiver node 508, the data receiver 110, the receiver validator 606, the receiver blockchain, the membership node 1102, the membership provider 1106, the membership blockchain 1108, and/or the system 100. Alternatively or in addition, the memory may include any other component or sub-component of the system 100 described herein.

The user interface 1618 may include any interface for displaying graphical information. The system circuitry 1614 and/or the communications interface(s) 1612 may communicate signals or commands to the user interface 1618 that cause the user interface to display graphical information. Alternatively or in addition, the user interface 1618 may be remote to the system 100 and the system circuitry 1614 and/or communication interface(s) may communicate instructions, such as HTML, to the user interface to cause the user interface to display, compile, and/or render information content. In some examples, the content displayed by the user interface 1618 may be interactive or responsive to user input. For example, the user interface 1618 may communicate signals, messages, and/or information back to the communications interface 1612 or system circuitry 1614.

The system 100 may be implemented in many different ways. In some examples, the system 100 may be implemented with one or more logical components. For example, the logical components of the system 100 may be hardware or a combination of hardware and software. The logical components may include the furnisher node 506, the furnisher validator 604, the furnisher blockchain, the data receiver node 508, the data receiver 110, the receiver validator 606, the receiver blockchain, the membership node 1102, the membership provider 1106, the membership blockchain 1108, the system 100, and/or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 1620, for example, that comprises instructions executable with the processor 1616 or other processor to implement one or more of the features of the logical components. When any one of the logical components includes the portion of the memory that comprises instructions executable with the processor 1616, the component may or may not include the processor 1616. In some examples, each logical component may just be the portion of the memory 1620 or other physical memory that comprises instructions executable with the processor 1616, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

While various embodiments have been described, it will be apparent to those of ordinary skill in the art that many more embodiments and implementations are possible.

What is claimed is:

1. A system for blockchain interoperability comprising:
   a furnisher validator node of a furnisher distributed ledger technology (DLT) network, the furnisher validator node configured to:
      digitally sign a certification of token data, the token data being stored on a furnisher blockchain, the certification being signed based on a public key for the furnisher validator node; and
   a receiver validator node of a receiver DLT network, the receiver validator node configured to:
      access a furnisher credential stored on a membership blockchain;
      identify, in the furnisher credential, the public key for the furnisher validator node;
      verify the certification is digitally signed by the furnisher validator node based on the public key for the furnisher validator node by confirming that a certification digital signature by the furnisher includes a certification hash generated based on the certification;
      digitally sign a validation of the certification in response to verification of the certification being signed by the furnisher validator node by generating a validation digital signature including a validation hash generated based on the validation; and
      store the signed validation on a receiver blockchain.

2. The system of claim 1, wherein the certification of token data comprises a certification that the token data is locked on the furnisher blockchain, wherein storing the signed validation enables committal of the token data to the receiver blockchain.

3. The system of claim 1, further comprising:
   a data receiver node of the receiver DLT network, the data receiver node configured to:
      determine a plurality of receiver validator nodes digitally signed corresponding to validations of the certification;
      commit the token data to the receiver blockchain in response to determination of the validations being signed by the receiver validator nodes.

4. The system of claim 1, wherein the receiver validator node is further configured to:
   verify the furnisher credential is valid, wherein to verify the furnisher credential is valid, the receiver validator node is further configured to:
   access, from the membership blockchain, a furnisher credential definition,
   identify furnisher credentials for a plurality of furnisher validators based on the furnisher credential definition, and
   determine the furnisher credential is digitally signed based on the identified furnisher credentials.

5. The system of claim 4, wherein the furnisher validator node is further configured to:
   generate the furnisher credential definition;
   digitally sign the furnisher credential definition; and
   cause the furnisher credential definition to be stored on the membership blockchain.

6. The system of claim 4, wherein the furnisher validator node is further configured to:
   detect a modification to the furnisher credential;
   digitally sign a multi-signature certification of the modification; and
   cause storage of the signed multi-signature certification of the modification on the membership blockchain.

7. The system of claim 1, wherein the receiver validator node is further configured to:
   generate a receiver credential, the receiver credential comprising a public key for the receiver validator node; and
   cause storage of the receiver credential on the membership blockchain.

8. The system of claim 7, wherein the receiver validator node is further configured to:
   digitally sign a certification of the furnisher credential, the certification comprising a multi-signature certification signed by other receiver validators of the receiver DLT network; and
   cause storage of the signed certification of the furnisher credential on the membership blockchain.

9. The system of claim 1, further comprising a membership provider node of a membership DLT network, the membership provider node in communication with the furnisher validator node and the receiver validator node, the membership blockchain being stored by the membership provider node.

10. A method comprising:
    receiving, by a receiver validator node of a receiver distributed ledger technology (DLT) network, a certification of token data stored on a furnisher blockchain, the certification signed by a plurality of furnisher validator nodes of a furnisher DLT network, wherein a receiver node of the receiver DLT network commits the token data to a receiver blockchain in response to validation of the certification by a plurality of receiver validators of the receiver DLT network; and validating the certification by:
obtaining, by the receiver validator node, a plurality of furnisher credentials stored on a membership blockchain, the furnisher credentials comprising respective public keys for at least a portion of the furnisher validator nodes of the furnisher DLT network;
determining the furnisher validator nodes signed the certification based on the respective public keys by confirming that a certification digital signature by the furnisher includes a certification hash generated based on the certification;
digitally signing a validation of the certification by generating a validation digital signature including a validation hash generated based on the validation; and
storing the validation on the receiver blockchain to enable committal of the token data on the furnisher blockchain.

11. The method of claim 10, wherein the certification comprises a certification that the token data is locked on the furnisher blockchain.

12. The method of claim 11, further comprising:
determining a plurality of receiver validators nodes previously validated the certification; and
committing the token data to the furnisher blockchain in response validation of the certification by the receiver validators.

13. The method of claim 10, further comprising:
determining the furnisher credential is valid by:
accessing, from the membership blockchain, a furnisher credential definition,
identifying furnisher credentials for at least one of the furnisher validator nodes based on the furnisher credential definition, and
determining the furnisher credential is digitally signed based on the identified at least one of the furnisher credentials.

14. The method of claim 10, further comprising:
generating a receiver credential definition;
digitally signing the receiver credential definition; and
cause storage of the receiver credential definition on the membership blockchain.

15. The method of claim 14, further comprising:
generating a credential for the receiver validator;
digitally signing the credential; and
causing storage of the certification in response to the certification being signed by a plurality of receiver validator nodes, the receiver validator nodes being identified in the receiver credential definition.

16. A method comprising:
receiving, by a furnisher validator node of a furnisher distributed ledger technology (DLT) network, a certification of token data stored on a receiver blockchain, the certification signed by a plurality of receiver validator nodes of a receiver DLT network, wherein a furnisher node of the furnisher DLT network locks the token data on a furnisher blockchain in response to validation of the certification by a plurality of furnisher validator nodes of the furnisher DLT network; and
validating the certification by:
obtaining, by the furnisher validator node, a receiver credential stored on a membership blockchain, the receiver credential comprising a public key for a receiver validator node of the receiver DLT network;
determining the receiver validator node signed the certification based on the public key of the receiver validator node by confirming that a certification digital signature by the furnisher includes a certification hash generated based on the certification;
digitally signing a validation of the certification by generating a validation digital signature including a validation hash generated based on the validation; and
storing the validation on the furnisher blockchain to enable the token data to be locked on the furnisher blockchain.

17. The method of claim 16, wherein the certification comprises a confirmation that the token data is stored on the receiver blockchain.

18. The method of claim 16, further comprising:
determining the plurality of furnisher validator nodes previously validated the certification; and
committing the token data to the furnisher blockchain in response to validation of the certification by the furnisher validator nodes.

19. The method of claim 16, further comprising:
verifying the receiver credential is valid by:
accessing, from the membership blockchain, a receiver credential definition,
identifying receiver credentials for a plurality of receiver validators based on the receiver credential definition, and
determining the receiver credential is digitally signed based on the identified receiver credentials.

20. The method of claim 16 wherein the membership blockchain is separate and distinct from the furnisher blockchain and the receiver blockchain.

21. A system for blockchain interoperability comprising:
a furnisher validator node of a furnisher distributed ledger technology (DLT) network, the furnisher validator node configured to:
digitally sign a certification of token data, the token data being stored on a furnisher blockchain, the certification being signed based on a public key for the furnisher validator node, the certification including a certification that the token data is locked on the furnisher blockchain; and
a receiver validator node of a receiver DLT network, the receiver validator node configured to:
access a furnisher credential stored on a membership blockchain;
identify, in the furnisher credential, the public key for the furnisher validator node;
verify the certification is digitally signed by the furnisher validator node based on the public key for the furnisher validator node;
digitally sign a validation of the certification in response to verification of the certification being signed by the furnisher validator node; and
store the signed validation on a receiver blockchain.

22. A method comprising:
receiving, by a receiver validator node of a receiver distributed ledger technology (DLT) network, a certification of token data stored on a furnisher blockchain, the certification signed by a plurality of furnisher validator nodes of a furnisher DLT network, wherein a receiver node of the receiver DLT network commits the token data to a receiver blockchain in response to validation of the certification by a plurality of receiver validators of the receiver DLT network, the certification including a certification that the token data is locked on the furnisher blockchain; and validating the certification by:
  obtaining, by the receiver validator node, a plurality of furnisher credentials stored on a membership blockchain, the furnisher credentials comprising respective public keys for at least a portion of the furnisher validator nodes of the furnisher DLT network;
  determining the furnisher validator nodes signed the certification based on the respective public keys;
  digitally signing a validation of the certification; and
  storing the validation on the receiver blockchain to enable committal of the token data on the furnisher blockchain.

23. A method comprising:
receiving, by a furnisher validator node of a furnisher distributed ledger technology (DLT) network, a certification of token data stored on a receiver blockchain, the certification signed by a plurality of receiver validator nodes of a receiver DLT network, wherein a furnisher node of the furnisher DLT network locks the token data on a furnisher blockchain in response to validation of the certification by a plurality of furnisher validator nodes of the furnisher DLT network, the certification including a certification that the token data is locked on the furnisher blockchain; and validating the certification by:
  obtaining, by the furnisher validator node, a receiver credential stored on a membership blockchain, the receiver credential comprising a public key for a receiver validator node of the receiver DLT network;
  determining the receiver validator node signed the certification based on the public key of the receiver validator node;
  digitally signing a validation of the certification; and
  storing the validation on the furnisher blockchain to enable the token data to be locked on the furnisher blockchain.

* * * * *